(12) United States Patent
Kim

(10) Patent No.: US 10,896,558 B2
(45) Date of Patent: Jan. 19, 2021

(54) APPARATUS FOR INSPECTING DRIVER ASSISTANCE SYSTEM OF VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventor: Dong Myong Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/781,594

(22) Filed: Feb. 4, 2020

(65) Prior Publication Data
US 2020/0175791 A1 Jun. 4, 2020

Related U.S. Application Data

(62) Division of application No. 15/367,963, filed on Dec. 2, 2016, now abandoned.

(30) Foreign Application Priority Data

Sep. 13, 2016 (KR) .................... 10-2016-0117972

(51) Int. Cl.
*G06K 9/00* (2006.01)
*G07C 5/12* (2006.01)
(Continued)

(52) U.S. Cl.
CPC ............. *G07C 5/12* (2013.01); *G01S 7/40* (2013.01); *G01S 7/4052* (2013.01); *G01S 13/931* (2013.01); *G06K 9/00798* (2013.01); *G06K 9/00832* (2013.01); *G07C 5/0808* (2013.01); *H04N 5/23216* (2013.01);
(Continued)

(58) Field of Classification Search
CPC ..................... G06K 9/00832; G07C 5/0808
See application file for complete search history.

(56) References Cited

U.S. PATENT DOCUMENTS 6,636,172 B1 10/2003 Prestl et al.
8,368,761 B2 2/2013 Chung
(Continued)

FOREIGN PATENT DOCUMENTS

DE 10 2014 113 919 A1 5/2015
DE 10 2014 224 302 A1 6/2015
(Continued)

OTHER PUBLICATIONS

Office Action issued in corresponding German Patent Application No. 10 2017 201 639.6 dated May 27, 2020, with English abstract.
(Continued)

*Primary Examiner* — Y Lee
(74) *Attorney, Agent, or Firm* — Morgan, Lewis & Bockius LLP

(57) ABSTRACT

An apparatus for inspecting driver assistance systems provided in a vehicle includes a multi-joint robot, a first inspection unit mounted on the multi-joint robot and configured for inspecting some of the driver assistance systems inside the vehicle, and a second inspection unit separably mounted from the multi-joint robot or the first inspection unit and configured for inspecting other of the driver assistance systems from an outside of the vehicle.

14 Claims, 19 Drawing Sheets

1 - Apparatus for inspecting a driver assistance
20 - Multi-joint robot
30, 40, 50 - First, second, and third inspection units
61, 62 - First, second transfer unit
613, 623 - First, second carriage
611, 612, 621, 622 - First, second, third, fourth vertical transfer machine

(51) Int. Cl.
*G01S 13/931* (2020.01)
*G01S 7/40* (2006.01)
*H04N 17/00* (2006.01)
*G07C 5/08* (2006.01)
*H04N 5/232* (2006.01)
*G06K 9/32* (2006.01)
*G01S 13/86* (2006.01)
*H01Q 15/18* (2006.01)
*H01Q 17/00* (2006.01)
*H04N 7/18* (2006.01)

(52) U.S. Cl.
CPC .......... *H04N 17/002* (2013.01); *G01S 13/867* (2013.01); *G01S 2007/4086* (2013.01); *G01S 2013/9327* (2020.01); *G06K 2009/3225* (2013.01); *H01Q 15/18* (2013.01); *H01Q 17/00* (2013.01); *H04N 7/181* (2013.01); *Y10S 901/44* (2013.01)

(56) References Cited

U.S. PATENT DOCUMENTS

| | | |
|---|---|---|
| 9,517,725 B2 | 12/2016 | Kim |
| 9,545,966 B2 | 1/2017 | Kim |
| 9,573,524 B2 | 2/2017 | Kim |
| 9,987,750 B2 | 6/2018 | Yeum |
| 2011/0285856 A1 | 11/2011 | Chung |
| 2015/0134191 A1 | 5/2015 | Kim |
| 2015/0168719 A1 | 6/2015 | Kim |

FOREIGN PATENT DOCUMENTS

| | | |
|---|---|---|
| KR | 10-1510336 B1 | 4/2015 |
| KR | 10-1526424 B1 | 6/2015 |

OTHER PUBLICATIONS

Office Action issued in corresponding Chinese Patent Application No. 2016111306950 dated Oct. 28, 2019, with English abstract.
Final Office Action issued in corresponding U.S. Appl. No. 15/367,963 dated Nov. 7, 2019.
Office Action issued in corresponding U.S. Appl. No. 15/367,963 dated Jul. 17, 2019.
Final Office Action issued in corresponding U.S. Appl. No. 15/367,963 dated Jan. 24, 2019.
Office Action issued in corresponding U.S. Appl. No. 15/367,963 dated Aug. 31, 2018.

61 - First transfer unit
613 - First carriage
613-1 - Linear rail
613-2, 613-3 - First, second linear motor 67 - Cable chain
68 - Support member
68a - Support frame
68b - Support roller
E - Electric wirings
22 - First multi-joint robot 31 - First unit frame
331 - Vision camera
332 - Touch probe
333 - Actuator
43 - SCC Inspector
431 - SCC radar detector
432 - Absorbing member
432a - Opening
44 - LDWC inspector
441 - LDWS display 332 - Touch probe
332a - Contact member
332b - Conductive member
332c - Elastic member 13 - Seating frame
13a - Aligning groove
41 - Second unit frame
41a - Second mounting bracket
41b - Alignment protrusion
42 - Second coupler 22 - First multi-joint robot
221 - Arm
222 - Shaft
34 - HUD inspector
33 - AVM inspector
35 - Sensing sensor 13 - Seating frame
13a - Aligning groove
40 - Second inspection unit
41 - Second unit frame
41a - Second mounting bracket
41b - Alignment protrusion
42 - Second coupler 612 - Second vertical transfer machine
24 - Second multi-joint robot
241 - Arm
242 - Shaft
50 - Third inspection unit
52 - BSD radar reflector 22, 24, 26, 28 - First, second, third, fourth multi-joint robot
611, 612, 621, 622 - First, second, third, fourth vertical transfer machine

APPARATUS FOR INSPECTING DRIVER ASSISTANCE SYSTEM OF VEHICLE AND METHOD FOR CONTROLLING THE SAME

CROSS-REFERENCE TO RELATED APPLICATION

This application is a divisional application of U.S. patent application Ser. No. 15/367,963 filed on Dec. 2, 2016, which is based on and claims the benefit of priority to Korean Patent Application No. 10-2016-0117972 filed on Sep. 13, 2016 in the Korean Intellectual Property Office, the disclosures of which are incorporated herein in their entirety by reference.

TECHNICAL FIELD

The present disclosure relates to an apparatus for inspecting a driver assistance system of a vehicle and a method for controlling the same.

BACKGROUND

In recent years, to provide driving convenience and safety to a driver while a vehicle drives, various driver assistance systems (DASs) have been mounted in the vehicle.

The driver assistance system uses various cameras, radar sensors, or the like to perform inside lane keeping, lane departure warning, safety distance assurance from adjacent vehicles, collision avoidance with near obstacles, a speed control based on a traffic condition or road environment, or the like in the state in which there is no operation of a driver operation.

The driver assistance system has been mostly applied only to luxury cars. However, as an interest in eco-friendly economic driving is suddenly increased recently to protect environment and save energy resources, the application of the driver assistance system has been rapidly expanded to a medium-sized car and a compact car.

For example, the driver assistance system may include systems such as a smart cruise control (SCC), a lane departure warning system (LDWS), an around view monitoring system (AVM), a head up display (HUD), and a blind spot detection (BSD).

Meanwhile, it is inspected whether various driver assistance systems mounted in a vehicle are normally operated in a car inspection line during the automobile assembly process.

For example, a vehicle moves to a wheel alignment inspection process, a roll & brake inspection process, an automated diagnosis process, or the like of the car inspection line. In these processes, it is inspected whether various driver assistance systems as described above are normally operated.

By the way, the related art has a problem in that the inspection processes of various driver assistance systems are separated by function in the car inspection line and therefore an inspection cycle time may be increased and it has trouble in operating an inspection personnel and managing quality.

To solve the problem, an apparatus for inspecting a driver assistance system having an improved structure to be able to install a plurality of inspection units that may each inspect any one of the driver assistance systems in a single inspection booth (Korean Patent No. 10-1510336 (registered on Apr. 1, 2015)).

In the existing apparatus for inspecting a driver assistance system, the inspection units are only installed in the single inspection booth and have a structure in which they are physically separated from each other. Therefore, to prevent mutual interference from occurring between the inspection units, the inspection units are installed to be spaced apart from each other by a predetermined safety distance and an inspection sequence of the driver assistance systems is determined in consideration of a movement of the inspection units. Therefore, the existing driver assistance system has a problem in that an area of the inspection booth is wide and the time required for an inspection of driver assistance systems is long.

Further, according to the existing apparatus for inspecting a driver assistance system, an operator may not enter the inspection booth during the inspection of the driver assistance system depending on various regulations (Article 27 (1) of Korean Industrial Safety and Health Act) defined not to permit the entry of the operator into the inspection booth when a plurality of robots that can be independently operated are being operated together within the single booth. Therefore, the existing apparatus for inspecting a driver assistance system has a problem in that an operator may not manage and operate the inspection units in real time by entering the inspection booth during the inspection of the driver assistance system.

SUMMARY

The present disclosure has been made to solve the above-mentioned problems occurring in the prior art while advantages achieved by the prior art are maintained intact.

An aspect of the present disclosure provides an apparatus for inspecting a driver assistance system having an improved structure to reduce a required area of an inspection booth in which inspection units are installed.

Another aspect of the present disclosure provides an apparatus for inspecting a driver assistance system having an improved structure to reduce the time required for inspection of driver assistance systems.

Still another aspect of the present disclosure provides an apparatus for inspecting a driver assistance system having an improved structure to permit an operator to enter an inspection booth even during an inspection of driver assistance systems.

Yet another aspect of the present disclosure provides an apparatus for inspecting a driver assistance system having an improved structure to control internal environment of an inspective booth to be the same as a manufacturing line of a vehicle.

Still yet another aspect of the present disclosure provides an apparatus for inspecting a driver assistance system having an improved structure to permit an operator to enter an inspection booth even during an inspection of a driver assistance system to thereby manage and operate inspectors.

According to an exemplary embodiment of the present disclosure, an apparatus for inspecting driver assistance systems provided in a vehicle includes: a multi-joint robot; a first inspection unit mounted on the multi-joint robot and inspecting some of the driver assistance systems inside the vehicle; and a second inspection unit separably mounted from the multi-joint robot or the first inspection unit and inspecting other some of the driver assistance systems from an outside of the vehicle.

The first inspection unit may include an AVM inspector provided to inspect an AVM system inside the vehicle and an HUD inspector provided to inspect an HUD system inside the vehicle and the second inspection unit may include an SCC inspector provided to inspect an SCC system from the outside of the vehicle and an LDWS inspector provided to inspect an LDWS from the outside of the vehicle.

The second inspection unit may be separated from the multi-joint robot or the first inspection unit at the time of inspecting at least one of the AVM system and the HUD system and may be mounted on the multi-joint robot or the first inspection unit at the time of inspecting at least one of the SCC system and the LDWS.

The first inspection unit may include a first unit frame mounted on the multi-joint robot and the second inspection unit may include a second unit frame separably mounted from the first unit frame.

The first inspection unit may further include a first coupler installed on the first unit frame, the second inspection unit may further include a second coupler installed on the second unit frame and separably coupled with the first coupler, and the first unit frame and the second unit frame may be separably coupled with each other by the first coupler and the second coupler.

The AVM inspector may include a vision camera photographing a screen of the AVM system and a touch probe performing a touch operation on the screen of the AVM system to calibrate the AVM system.

The touch probe may include a contact member contacting the screen of the AVM system and a conductive member disposed in the contact member.

The AVM inspector may perform the touch operation on the screen of the AVM system by a direct contact between the contact member and the screen of the AVM system when the screen of the AVM system is configured of a resistive touch screen and the AVM inspector may perform the touch operation on the screen of the AVM system by a conduction between the screen of the AVM system and the conductive member when the screen of the AVM system is configured of a capacitive touch screen.

The conductive member may be configured of a conductive metal string.

The touch probe may further include an elastic member elastically contracted by a pressing force applied when the contact member contacts the screen of the AVM system to absorb scattering of the screen of the AVM system.

The apparatus may further include: an AVM target providing a location reference point of the vehicle for inspecting the AVM system; and a transfer stage transferring the AVM target depending on specifications of the vehicle.

The HUD inspector may include a vision camera photographing an image displayed on a windshield glass of the vehicle by the HUD system.

The apparatus may further include: a roll screen blocking the windshield glass from external light.

The roll screen may include a reference pattern for performing a calibration of the vision camera.

The SCC inspector may include an SCC radar reflector reflecting an SCC radar signal output from an SCC radar sensor of the SCC system and inputting the reflected SCC radar signal to a receiver of the SCC system.

The SCC inspector may further include an absorbing member absorbing the SCC radar signal that is not reflected by the SCC radar reflector.

The SCC inspector may further include a tilting member adjusting a disposition angle of the SCC radar reflector depending on a disposition form of the SCC radar sensor.

The multi-joint robot and the second inspection unit may be each provided in plural and at least some of the multi-joint robots and the second inspection units may be selectively operated depending on the installation number of SCC radar sensors.

The LDWS inspector may include an LDWS display outputting an image for LDWS inspection.

The apparatus may further include: a third inspection unit mounted on the multi-joint robot and inspecting a BSD system, in which the third inspection unit may include a BSD radar reflector reflecting a BSD radar signal output from a BSD radar sensor of the BSD system and inputting the reflected BSD radar signal to a receiver of the BSD system.

According to another exemplary embodiment of the present disclosure, a method for controlling an apparatus for inspecting a driver assistance system having a multi-joint robot, a first inspection unit mounted on the multi-joint robot, and a second inspection unit separably mounted from the first inspection unit, the method comprising the step of: (a) inspecting systems, which are inspected from the outside of the vehicle, among the driver assistance systems using the second inspection unit; (b) separating the second inspection unit from the first inspection unit; and (c) inspecting systems, which are inspected inside the vehicle, among the driver assistance systems using the first inspection unit.

The step (a) is performed by inspecting at least one of the SCC system, the LDWS, and the BSD system.

The step (b) is performed by separating the first coupler included in the first inspection unit and the second coupler included in the second inspection unit from each other.

The step (c) is performed by inspecting at least one of the AVM system and the HUD system.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
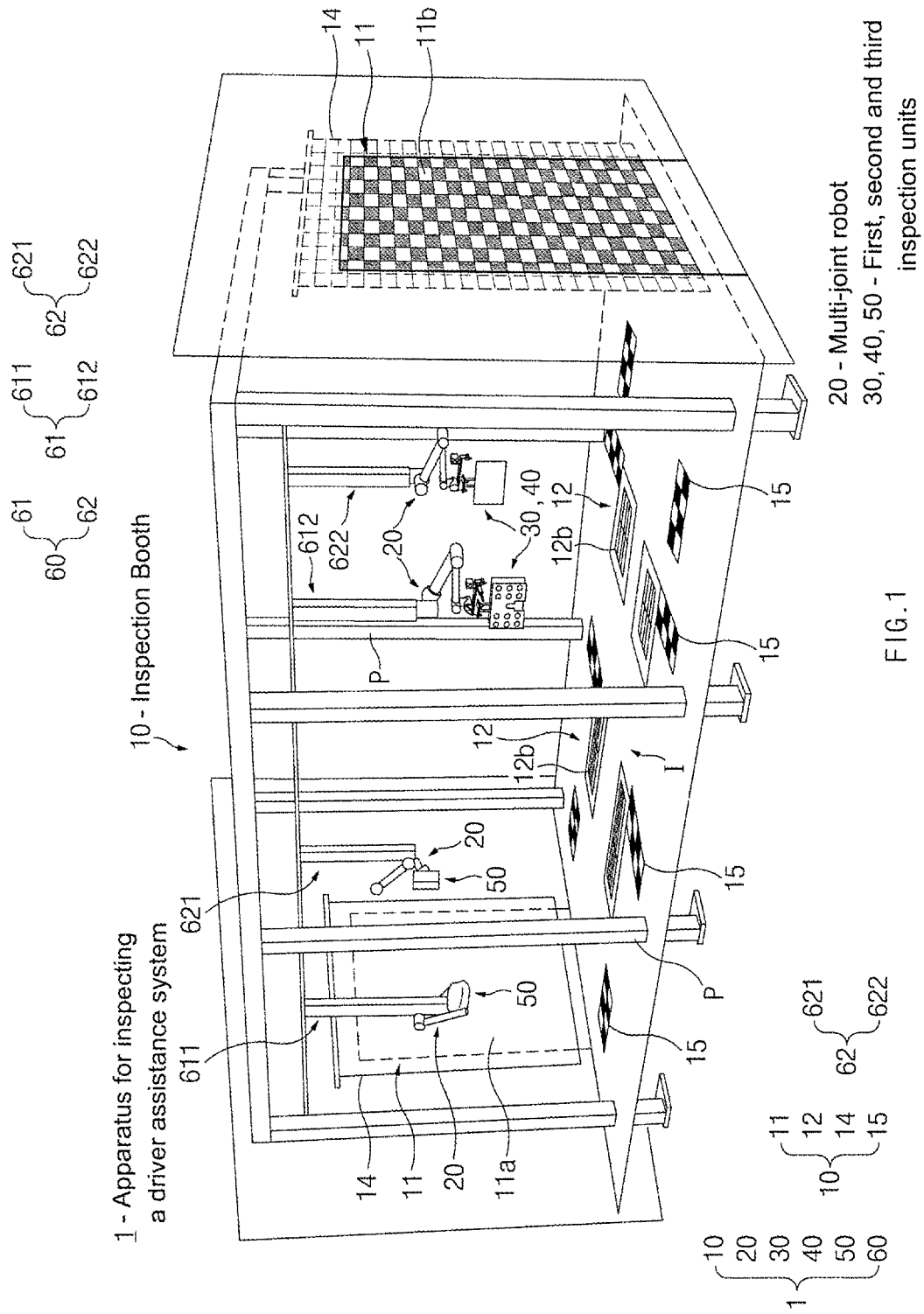
FIG. 1 is a perspective view of an apparatus for inspecting a driver assistance system according to an exemplary embodiment of the present disclosure.

Terms and words used in the present specification and claims are not to be construed as a general or dictionary meaning but are to be construed as meaning and concepts meeting the technical ideas of the present disclosure based on a principle that the inventors can appropriately define the concepts of terms in order to describe their own disclosures in best mode. Therefore, configurations described in exemplary embodiments and the accompanying drawings of the present disclosure do not represent all of the technical spirits of the present disclosure, but are merely most preferable embodiments. Therefore, the present disclosure should be construed as including all the changes, equivalents, and substitutions included in the spirit and scope of the present disclosure at the time of filing this application.

Sizes of each component illustrated in the drawings or specific parts forming the components may be exaggerated or simplified for clarity and convenience. Therefore, the size of each component does not exactly reflect its real size. Further, when it is determined that the detailed description of the known function or configuration related to the present disclosure may obscure the gist of the present disclosure, the detailed description thereof will be omitted.

Figure 2:
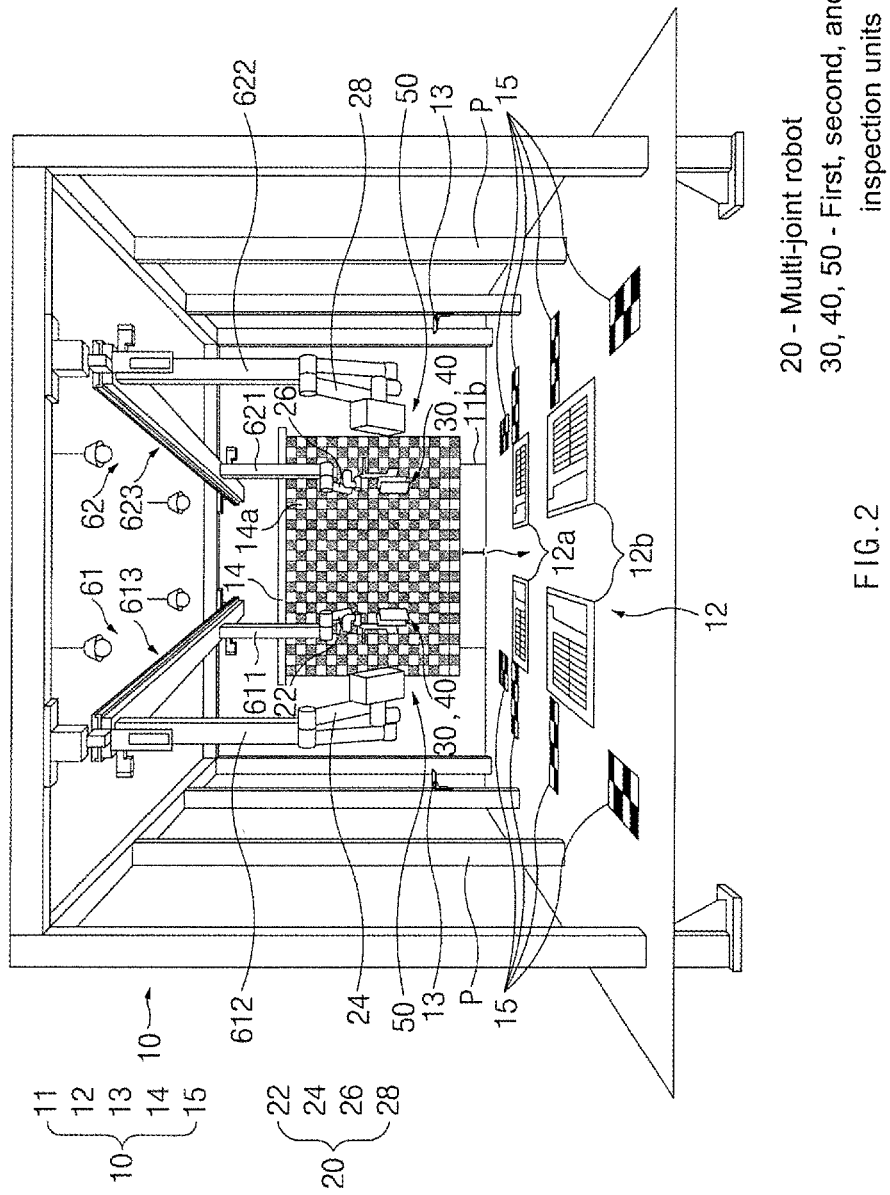
FIG. 2 is a diagram illustrating an inside of the apparatus for inspecting a driver assistance system illustrated in FIG. 1 that is viewed from the rear.

FIG. 1 is a perspective view of an apparatus for inspecting a driver assistance system according to an exemplary embodiment of the present disclosure and FIG. 2 is a diagram illustrating an inside of the apparatus for inspecting a driver assistance system illustrated in FIG. 1 that is viewed from the rear.

Figure 3:
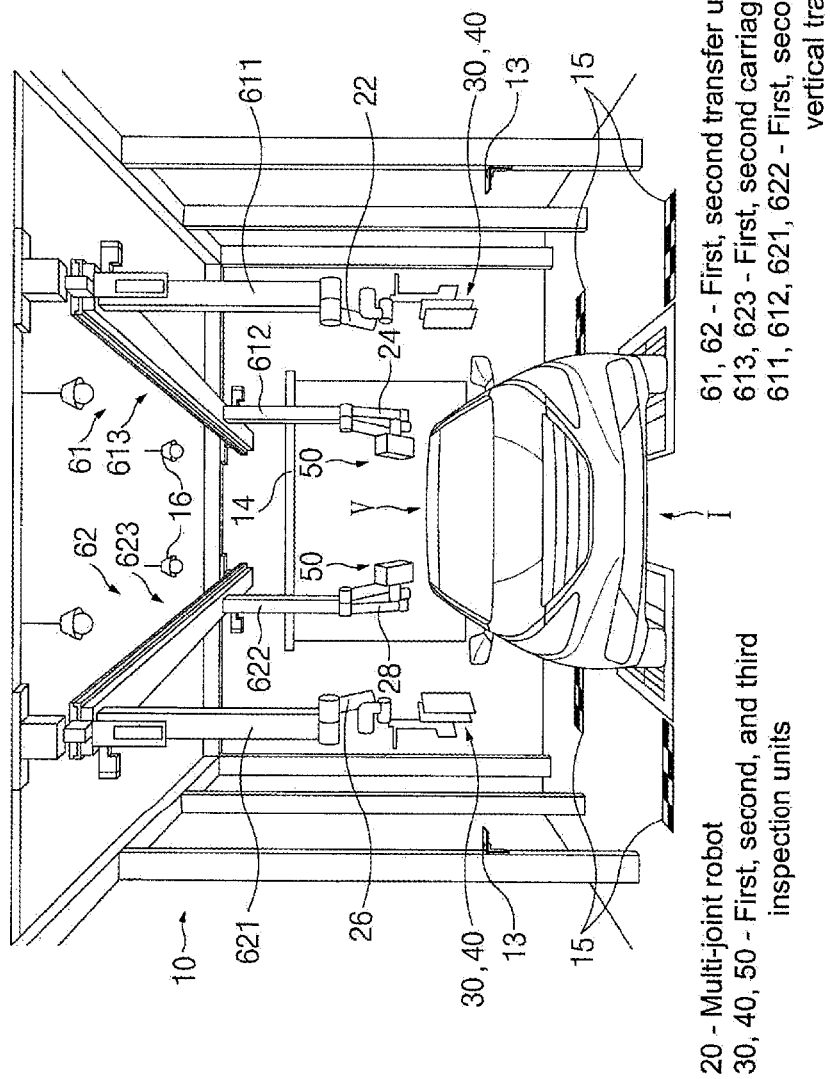
FIG. 3 is a diagram illustrating an inside of the apparatus for inspecting a driver assistance system illustrated in FIG. 1 that is viewed from the front.
Figure 4:
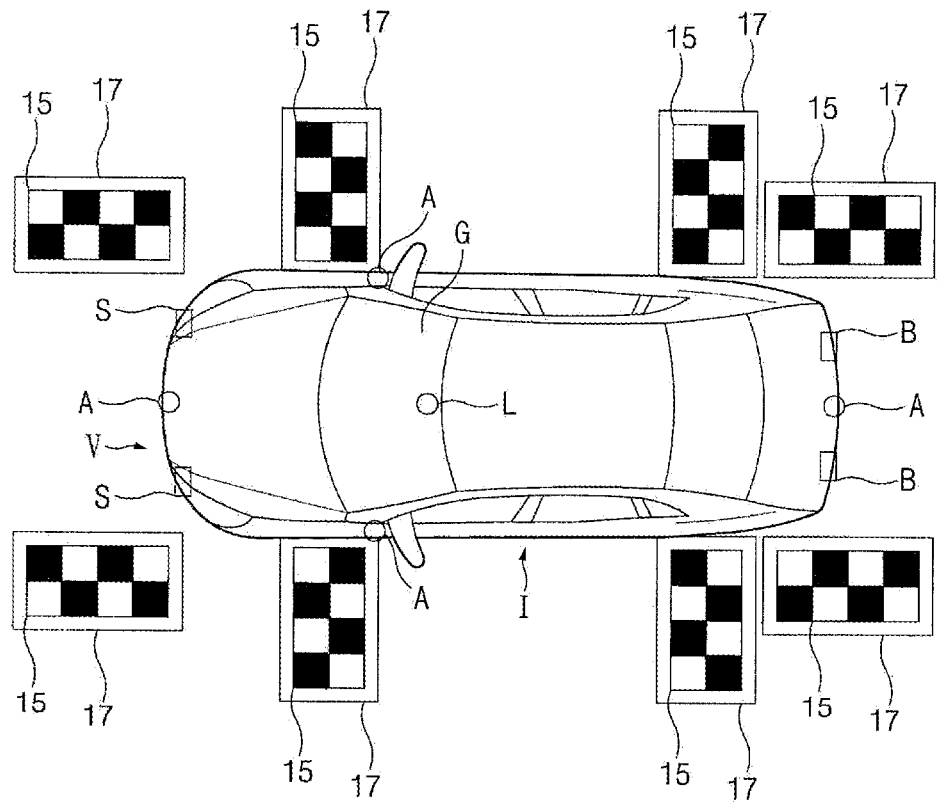
FIG. 4 is a plan view of the apparatus for inspecting a driver assistance system illustrated in FIG. 3.
Figure 5:
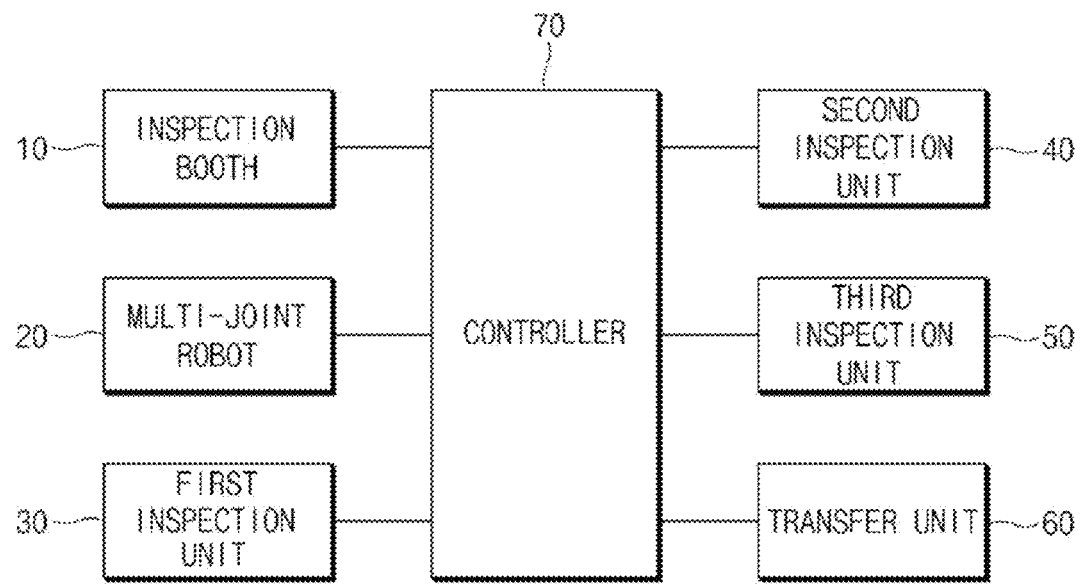
FIG. 5 is a block diagram for describing a control system of an apparatus for inspecting a driver assistance system illustrated in FIG. 1.

Further, FIG. 3 is a diagram illustrating an inside of the apparatus for inspecting a driver assistance system illustrated in FIG. 1 that is viewed from the front, FIG. 4 is a plan view of the apparatus for inspecting a driver assistance system illustrated in FIG. 3, and FIG. 5 is a block diagram for describing a control system of an apparatus for inspecting a driver assistance system illustrated in FIG. 1.

Referring to FIGS. 1 to 5, an apparatus 1 for inspecting a driver assistance system according to an exemplary embodiment of the present disclosure includes: an inspection booth 10; a multi-joint robot 20 moving in a multi-axis direction; a first inspection unit 30 mounted on the multi-joint robot 20 and provided to inspect some of driver assistance systems inside a vehicle V; a second inspection unit 40 separably mounted from the first inspection unit 30 and provided to inspect the other some of the driver assistance systems from an outside of the vehicle V; a third inspection unit 50 mounted on the multi-joint robot 20 and provided to inspect a BSD system; a transfer unit 60 transferring the multi-joint robot 20; and a controller 70 controlling an overall driving of the apparatus 1 for inspecting a driver assistance system.

In the present specification, a front and rear direction, a left and right direction, and an up and down direction each mean a front and rear direction, a left and right direction, and an up and down direction of the vehicle V that is disposed at a preset inspection location 1 of the inspection booth 10.

First, the inspection booth 10 is an apparatus that provides an installation space of the apparatus 1 for inspecting a driver assistance system.

As illustrated in FIG. 1, the inspection booth 10 is provided to be isolated from external noise and light and includes at least one entrance 11 through which the vehicle V may go in and out. The formation number of entrances 11 is not particularly limited. For example, as illustrated in FIG. 1, a pair of entrances 11 such as a first entrance 11a mounted on a front surface of the inspection booth 10 and a second entrance 11b mounted on a rear surface of the inspection booth 10 may be formed. For convenience of explanation, hereinafter, the exemplary embodiment of the present disclosure will be described based on the case in which the vehicle V enters the inspection booth 10 through the first entrance 11a and goes out the inspection booth 10 through the second entrance 11b.

The inspection booth 10 may further include various auxiliary facilities required for the inspection of the driver assistance system. For example, as illustrated in FIGS. 1 to 3, the inspection booth 10 may further include an aligner 12 aligning the vehicle V entering the inspection booth 10 at the preset inspection location I, a seating frame 13 having the second inspection unit 40 separated from the first inspection unit 30 seated thereon, a roll screen 14 covering the entrance 11, an AVM target 15 providing a reference point with respect to a location of the vehicle V, and a variable illumination 16 installed to irradiate light to an inner space of the inspection booth 10.

As illustrated in FIG. 2, the aligner 12 includes a front aligner 12a aligning a front wheel of the vehicle V at a preset location and a rear aligner 12b aligning a rear wheel of the vehicle V at a preset location. The aligner 12 is preferably configured of a free-pit aligning apparatus (refer to Korean Patent No. 10-1558389) without needing to perform a pit operation of forming a pit on a bottom surface of the inspection booth 10 to install the aligner 12 but is not limited thereto. As illustrated in FIGS. 3 and 4, the aligner 12 may align the vehicle V entering the inspection booth 10 at the preset inspection location I.

As illustrated in FIG. 3, the seating frame 13 is installed on a support pillar of the inspection booth 10. The seating frame 13 may have a shape corresponding to a second mounting bracket 41a of the second inspection unit 40 to have the second mounting bracket 41a of the second inspection unit 40 to be described below seated thereon. As illustrated in FIG. 2, the roll screen 14 may be installed at the second entrance 11b to block a windshield glass G of the vehicle V disposed at the preset inspection location I at a front side of the vehicle V. The roll screen 14 is wound to have a roll shape to open the second entrance 11b when the vehicle V goes out the inspection booth through the second entrance 11b. The roll screen 14 is wound out to have a sheet shape to cover the second entrance 11b at the time of inspecting the driver assistance systems. The roll screen 14 may prevent external light such as light of the vehicle V first going out the inspection booth 10 through the second entrance 11b from being introduced into the inspection booth 10 through the second entrance 11b.

Further, as illustrated in FIG. 2, the roll screen 14 is formed on a surface facing the windshield glass G of the vehicle V and may include a reference pattern 14a for performing a calibration of a vision camera 331 to be described below.

Meanwhile, the roll screen 14 is described as being installed to be located at the second entrance 11b but is not limited thereto. As illustrated in FIG. 3, the roll screen 14 may also be installed at the first entrance 11a to prevent external light from being introduced into the inspection booth 10 through the first entrance 11a.

As illustrated in FIG. 4, one AVM target 15 may be aligned, by the aligner 12, at front left and right sides of the vehicle V, lateral left and right sides of the vehicle V, and rear left and right sides of the vehicle V, respectively, with respect to the vehicle V located at the preset inspection location I and thus the number of AVM targets 15 may be six in total. The AVM targets 15 may provide a location reference point of the vehicle V to allow an AVM inspector 33 to inspect the AVM system.

By the way, the location reference point of the vehicle V may be changed depending on specifications of the vehicle V to be inspected. To solve the problem, the inspection booth 10 may further include transfer stages 17 that are provided to transfer the AVM targets 15 depending on the specifications of the vehicle V. As illustrated in FIG. 4, the transfer stages 17 are installed on the bottom surface of the inspection booth 10 to move in a front and rear direction and a left and right direction and the AVM targets 15 may each be installed at any one of the transfer stages 17.

As illustrated in FIG. 3, the variable illumination 16 is configured of an illumination of which illuminance may be controlled and is installed on a ceiling surface of the inspection booth 10. The variable illumination 16 may control illuminance of an inner space of the inspection booth 10 to be equal to illuminance of a manufacturing line and other external facilities in which the vehicle V is manufactured. Next, in the case of manufacturing and managing the vehicle in the manufacturing line and other external facilities, inspection data obtained by using the apparatus 1 for inspecting a driver assistance system without the calibration operation for calibrating an illuminance difference between the inspection booth 10 and external facilities may be used as they are to manufacture and manage the vehicle V.

The multi-joint robot 20 is an apparatus for transferring the inspection units 30, 40, and 50 in a multi-axis direction.

The installation number of multi-joint robots 20 is not particularly limited. For example, as illustrated in FIG. 2, a total of four multi-joint robots 20 may be installed. The multi-joint robots 20 may be mounted on any one of the first transfer unit 61 and the second transfer unit 62 to be described below while being formed in pair. Hereinafter, for convenience of explanation, the multi-joint robot 20 located in front of the inspection booth 10 among the multi-joint robots 20 mounted on the first transfer unit 61 is called a first multi-joint robot 22 and the multi-joint robot located in the back of the inspection booth 10 is called a second multi-joint robot 24. In response, the multi-joint robot 20 located in front of the inspection booth 10 among the multi-joint robots 20 mounted on the second transfer unit 62 is called a third multi-joint robot 26 and the multi-joint robot located in the back of the inspection booth 10 is called a fourth multi-joint robot 28.

The multi-joint robot 20 may transfer the inspection units 30, 40, and 50 in a multi-axis direction from the outside or the inside of the vehicle V. For example, as illustrated in FIG. 2, the first and third multi-joint robots 22 and 26 may each be provided with the first and second inspection units 30 and 40 and the first and third multi-joint robots 22 and 26 may each transfer the first and second inspection units 30 and 40 in the multi-axis direction. For example, as illustrated in FIG. 2, the second and fourth multi-joint robots 24 and 28 may each be provided with the third inspection unit 50 and the second and fourth multi-joint robots 24 and 28 may each transfer the third inspection unit 50 in the multi-axis direction.

Figure 6:
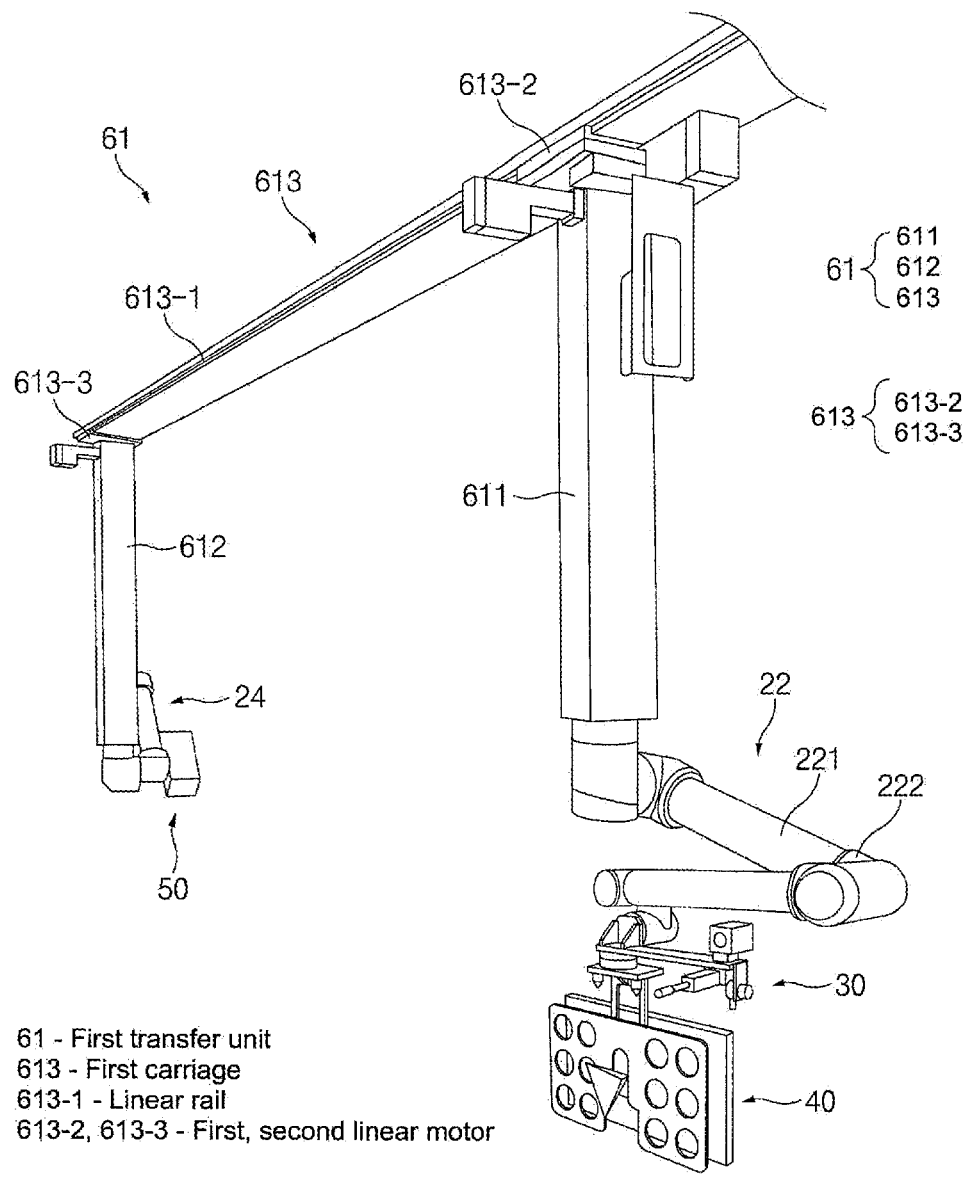
FIG. 6 is a diagram for describing a multi-joint robot and a transfer unit illustrated in FIG. 2.
Figure 7:
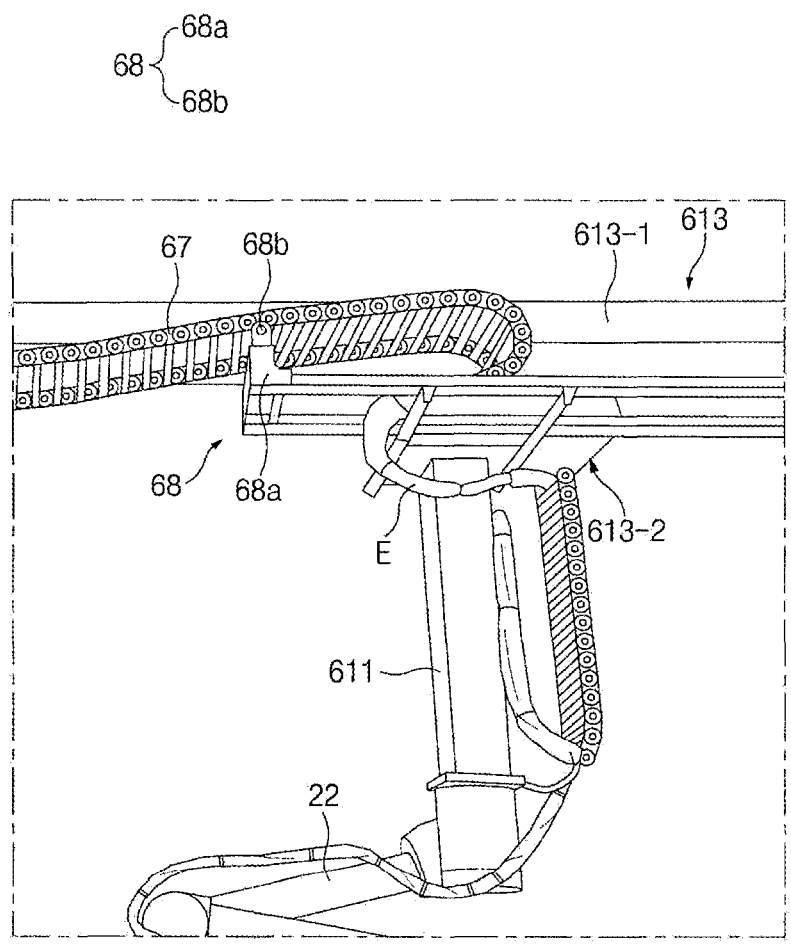
FIG. 7 is a diagram for describing a cable chain installed in the transfer unit illustrated in FIG. 6.

FIG. 6 is a diagram for describing a multi-joint robot and a transfer unit illustrated in FIG. 2 and FIG. 7 is a diagram for describing a cable chain installed in the transfer unit illustrated in FIG. 6.

As illustrated in FIG. 6, the first multi-joint robot 22 includes arms 221 and shafts 222 interconnecting the arms 221. The first multi-joint robot 22 is mounted on a vertical transfer machine 611 of the transfer unit 60 to be described below and at least a portion thereof is provided to enter the vehicle V through a window W of the vehicle V.

Next, the transfer unit 60 is an apparatus for transfer the multi-joint robot 20 and the inspection units 30, 40, and 50 coupled therewith in an up and down direction and a front and rear direction.

As illustrated in FIG. 3, the transfer unit 60 is provided in pair and the vehicle V disposed at the inspection location 1 is installed to be located in a space between the transfer units 60. Hereinafter, for convenience of explanation, the transfer unit 60 installed to be located at one side of the vehicle V disposed at the inspection location is called the first transfer unit 61 and the transfer unit 60 installed to be located at the other side of the vehicle V disposed at the inspection location 1 is called the second transfer unit 62.

As illustrated in FIG. 3, the first transfer unit 61 includes a first vertical transfer machine 611 having the first multi-joint robot 22 mounted on one end thereof to transfer the first multi-joint robot 22 in an up and down direction, a second vertical transfer machine 612 having the second multi-joint robot 24 mounted on one end thereof to transfer the second multi-joint robot 24 in an up and down direction, and a first carriage 613 transferring the first vertical transfer machine 611 and the second vertical transfer machine 612 in a front and rear direction.

As illustrated in FIG. 3, the second transfer unit 62 includes a third vertical transfer machine 621 having the third multi-joint robot 26 mounted on one end thereof to transfer the third multi-joint robot 26 in an up and down direction, a fourth vertical transfer machine 622 having the fourth multi-joint robot 28 mounted on one end thereof to transfer the fourth multi-joint robot 28 in an up and down direction, and a second carriage 623 transferring the third vertical transfer machine 621 and the fourth vertical transfer machine 622 in a front and rear direction.

The first transfer unit 61 and the second transfer unit 62 have the same structure except that they are symmetrically installed to each other having the vehicle V disposed therebetween. Therefore, for convenience of explanation, the first transfer unit 61 of the first transfer unit 61 and the second transfer unit 62 will mainly be described below.

The first vertical transfer machine 611 and the second vertical transfer machine 612 have the same structure. For example, as illustrated in FIG. 6, the first vertical transfer machine 611 and the second vertical transfer machine 612 may each be configured of a telescopic elevator of which the length may be controlled in a multistage.

The first vertical transfer machine 611 is mounted on the first carriage 613 to be located in front of the inspection booth 10 and the second vertical transfer machine 612 is mounted on the first carriage 613 to be located in the back of the inspection booth 10. Next, the first vertical transfer machine 611 may transfer the first multi-joint robot 22 and the first and second inspection units 30 and 40 in an up and down direction and the second vertical transfer machine 612 may transfer the second multi-joint robot 24 and the third inspection unit 50 in an up and down direction.

The third vertical transfer machine 621 may transfer the third multi-joint robot 26 and the first and second inspection units 30 and 40 in an up and down direction and the fourth vertical transfer machine 622 may transfer the fourth multi-joint robot 28 and the third inspection unit 50 in an up and down direction.

As illustrated in FIG. 6, the first carriage 613 may include a linear rail 613-1 installed on a ceiling of the inspection booth 10 to extend in a front and rear direction, a first linear motor 613-2 movably mounted on the linear rail 613-1 to be located in the front of the inspection booth 10, and a second linear motor 613-3 movably mounted on the linear rail 613-1 to be located in the back of the inspection booth 10.

The first linear motor 613-2 and the second linear motor 613-3 each generate a magnetic force and are provided to be reciprocated in a front and rear direction along the linear rail 613-1 by the magnetic force. The first linear motor 613-2 is provided with the other end of the first vertical transfer machine 611 and the second linear motor 613-3 is provided with the other end of the second vertical transfer machine 612.

The first carriage 613 may reciprocate the first vertical transfer machine 611 in a front and rear direction to reciprocate the first multi-joint robot 22 and the first and second inspection units 30 and 40 in a front and rear direction. Further, the first carriage 613 may reciprocate the second vertical transfer machine 612 in a front and rear direction to reciprocate the second multi-joint robot 24 and the third inspection unit 50 in a front and rear direction.

The second carriage 623 may reciprocate the third vertical transfer machine 621 in a front and rear direction to reciprocate the third multi-joint robot 26 and the first and second inspection units 30 and 40 in a front and rear direction. Further, the second carriage 623 may reciprocate the fourth vertical transfer machine 622 in a front and rear direction to reciprocate the fourth multi-joint robot 28 and the third inspection unit 50 in a front and rear direction.

Meanwhile, the inspection units 30, 40, and 50 are transferred by the multi-joint robot 20 and the transfer unit 60, and therefore electric wirings E electrically connecting between the inspection units 30, 40, and 50 and an electric supply source or a controller 70 need to have a sufficient length in consideration of a transfer distance of the inspection units 30, 40, and 50. As such, if the length of the electric wirings E is sufficient, the electric wirings E are twisted with the multi-joint robot 20 and the transfer unit 60 and therefore are likely to be damaged. To solve the problem, as illustrated in FIG. 7, the transfer unit 60 may further include a cable chain 67 into which the electric wirings E are buried and a support member 68 provided to support the cable chain 67.

One end of the cable chain 67 is installed to be fixed at a preset location, the other end of the cable chain 67 is installed to move in a front and rear direction along the vertical transfer machine 611 and 612, and a middle portion of the cable chain 67 is disposed to be bent in a 'U-letter' shape. For example, one end of the cable chain 67 may be fixed to the linear rail 613-1 and the other end of the cable chain 67 may be fixed to the linear motor 613-2. The cable chain 67 and the electric wirings E buried into the cable chain 67 may be transferred in a front and rear direction by the carriage 613. By this configuration, the cable chain 67 may be protected from the outside so that the electric wirings E are not twisted with the multi-joint robot 20 and the transfer unit 60.

By the way, one end of the cable chain 67 is fixed to the linear rail 613-1 and the other end thereof is fixed to the linear motor 613-2, and therefore the middle portion of the cable chain 67 is up in the air. For this reason, the middle portion of the cable chain 67 is intensively applied with a load and therefore sags, such that the cable chain 67 and the electric wirings E buried into the cable chain 67 are likely to be damaged. The support member 68 is provided to be able to support the middle portion of the cable chain 67. For example, as illustrated in FIG. 7, the support member 68 may include a support frame 68a installed to move in a front and rear direction along the first vertical transfer machine 611 when the carriage 613 transfers the first vertical transfer machine 611 in a front and rear direction and a support roller 68b mounted on the support frame 68a to support the middle portion of the cable chain 67. The support frame 68a is preferably fixed to the linear motor 613-2 but is not limited thereto. According to the support member 68, when the first vertical transfer machine 611 is transferred in a front and rear direction by the carriage 613, the support roller 68b may continuously support the middle portion of the cable chain 67 while being transferred in a front and rear direction by the support frame 68a to prevent the middle portion of the cable chain 67 from excessively sagging.

Figure 8:
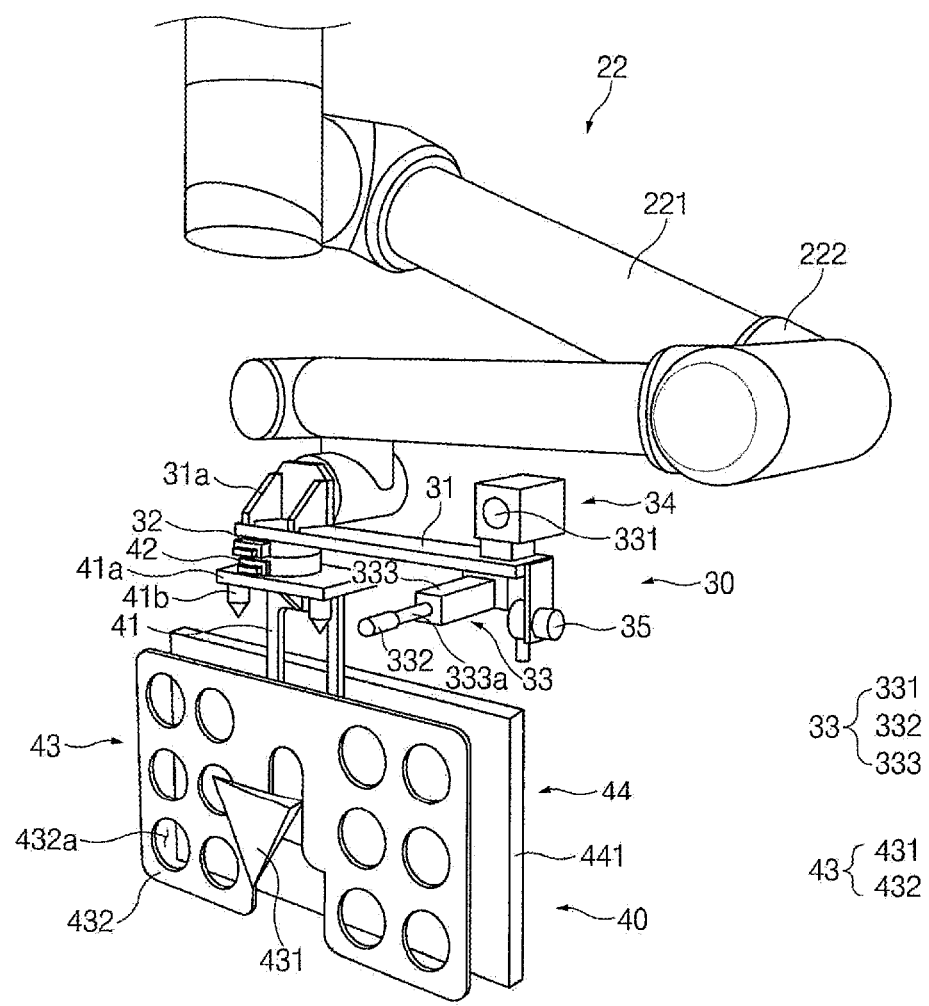
FIG. 8 is a diagram illustrating a state in which a first inspection unit and a second inspection unit illustrated in FIG. 2 are mounted in the multi-joint robot.
Figure 9:
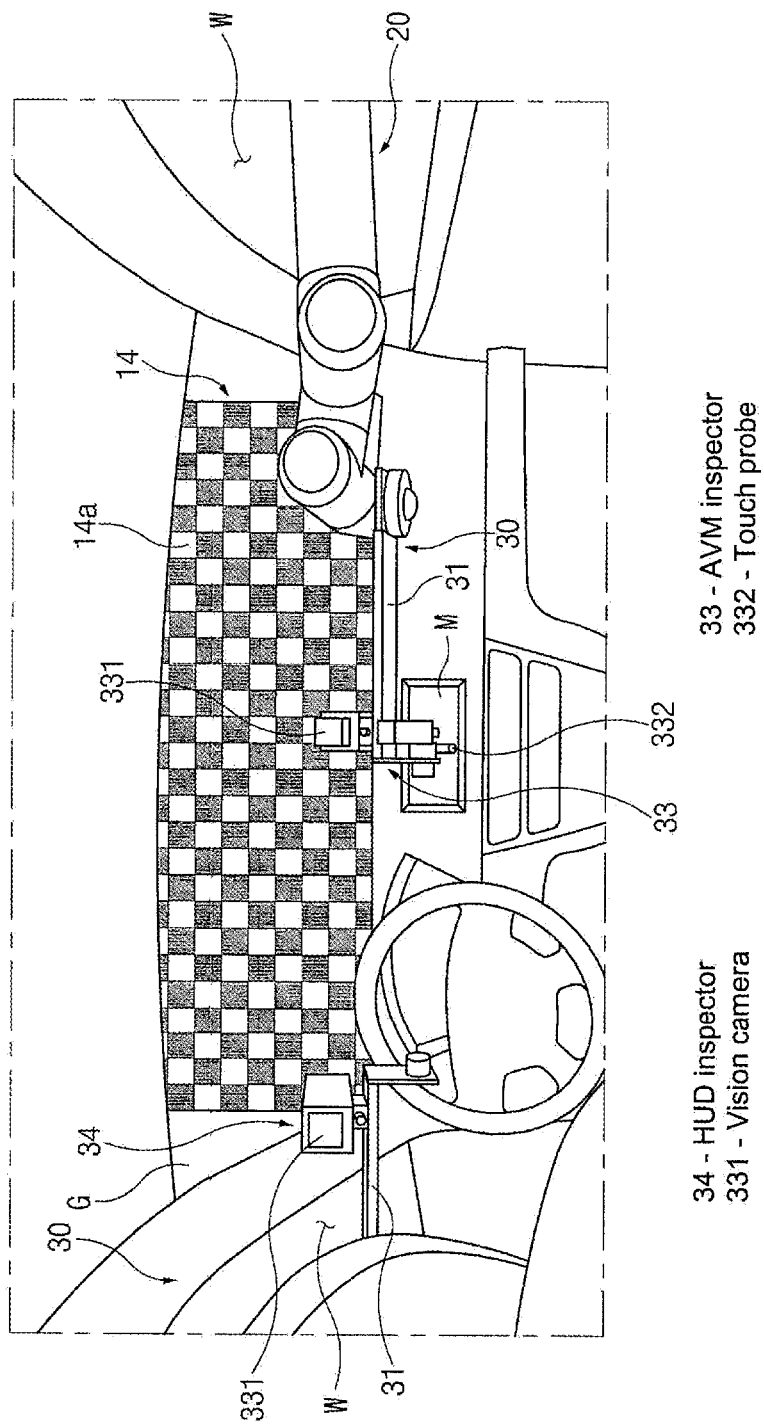
FIG. 9 is a diagram for describing a method for inspecting an AVM system and an HUD system using the first inspection unit illustrated in FIG. 8.
Figure 10:
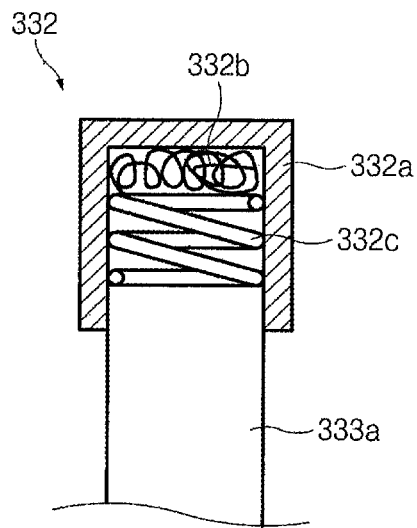
FIG. 10 is a cross-sectional view schematically illustrating an internal structure of a touch probe illustrated in FIG. 8.

FIG. 8 is a diagram illustrating a state in which a first inspection unit and a second inspection unit illustrated in FIG. 2 are mounted in the multi-joint robot, FIG. 9 is a diagram for describing a method for inspecting an AVM system and an HUD system using the first inspection unit illustrated in FIG. 8, and FIG. 10 is a cross-sectional view schematically illustrating an internal structure of a touch probe illustrated in FIG. 8.

Next, the first inspection unit 30 is an apparatus for inspecting an AVM system and an HUD system inside the vehicle V.

A structure of the first inspection unit 30 is not particularly limited. For example, as illustrated in FIG. 8, the first inspection unit 30 may include a first unit frame 31 forming a support frame of the first inspection unit 30, a first coupler 32 separating and coupling the first inspection unit 30 and the second inspection unit 40, an AVM inspector 33 provided to inspect the AVM system inside the vehicle V, an HUD inspector 34 provided to inspect the HUD system inside the vehicle V, and a sensing sensor 35 to sense a structure of the vehicle V.

As illustrated in FIG. 9, when the second inspection unit 40 is separated from the first inspection unit 30, the first inspection unit 30 has a preset shape so that at least a portion of the first inspection unit 30 may enter the vehicle V through the window W of the vehicle V. Further, the first inspection unit 30 is provided in pair by being mounted, one by one, on the first multi-joint robot 22 and the third multi-joint robot 26, respectively.

As illustrated in FIG. 8, the first unit frame 31 is mounted on an arm 221 provided at a distal end of the first multi-joint robot 22 or the third multi-joint robot 26 by a first mounting bracket 31a provided at one end thereof. The first unit frame 31 preferably has a board shape elongated in one direction from the first mounting bracket 31a, but is not limited thereto.

The first coupler 32 is installed on the first unit frame 31 not to interfere with the first multi-joint robot 22 or the third multi-joint robot 26. For example, as illustrated in FIG. 8, the first coupler 32 may be installed on a lower surface of one end of the first unit frame 31. A kind of couplers that may be used as the first coupler 32 is not particularly limited and therefore the coupler generally used in a tool changer field may be used as the first coupler 32. The first coupler 31 may be separably coupled with a second coupler 42 of the second inspection unit 40 to be described below to separably couple the first inspection unit 30 with the second inspection unit 40. The separation and coupling of the first inspection unit 30 and the second inspection unit 40 will be described below in more detail together with the description of the second coupler 42.

The AVM inspector 33 is provided to calibrate and inspect the AVM system that is provided in the vehicle V. Here, the around view monitoring (AVM) system means a technology that uses images photographed by a total of 4 AVM cameras A that are installed, one by one, at the front, rear, left, and right of the vehicle V, respectively, as illustrated in FIG. 4 to output, on a screen M (hereinafter, referred to as 'screen M of the AVM system) of a display apparatus provided in the vehicle V, images as if the vehicle V and the surroundings of the vehicle V are photographed from above.

A structure of the AVM inspector 33 is not particularly limited. For example, as illustrated in FIG. 8, the AVM inspector 33 may include a vision camera 331 photographing the screen M of the AVM system, a touch probe 332 touching the screen M of the AVM system to calibrate the AVM system, and an actuator 333 transferring the touch probe 332 to enable the touch probe 332 to touch the screen M of the AVM system.

The vision camera 331 is installed on the first unit frame 31 not to interfere with the first multi-joint robot 22 or the third multi-joint robot 26. For example, as illustrated in FIG. 8, the vision camera 331 may be installed on an upper surface of the other end of the first unit frame 31 that is opposite to one end of the first unit frame 31 on which the first mounting bracket 31a is mounted.

As illustrated in FIG. 9, the vision camera 331 may photograph the screen M of the AVM system in the state in which it enters the vehicle V by the first multi-joint robot 22 or the third multi-joint robot 26 and transfer the photographed image to the controller 70.

The touch probe 332 is installed on the actuator 333 to reciprocate by the actuator 333. For example, as illustrated in FIG. 8, when the actuator 333 is configured of a cylinder, the touch probe 332 may be coupled with a cylinder rod 333a333a to reciprocate along the cylinder rod 333a333a.

The touch probe 332 is provided to perform a touch operation on the screen M of the AVM system to calibrate the screen M of the AVM system. By the way, the screen M of the AVM system may be configured of a resistive touch screen or a capacitive touch screen depending on the specifications of the vehicle V. Therefore, the touch probe 332 is preferably configured to be applied both to the resistive touch screen and the capacitive touch screen. For example, as illustrated in FIG. 10, the touch probe 332 may include a contact member 332a provided to directly contact the screen M of the AVM system, a conductive member 332b disposed in the contact member 332a, and an elastic member 332c provided to be elastically contracted by a pressing force applied when the contact member 332a contacts the screen M of the AVM system.

As illustrated in FIG. 10, the contact member 332a has a thimble shape and is covered on an end of the cylinder rod 333a. The contact member 332a is preferably made of a rubber material but is not limited thereto. When the screen M of the AVM system is configured of the resistive touch screen, the contact member 332a may directly contact the screen M of the AVM system to perform the touch operation on the screen M of the AVM system.

As illustrated in FIG. 10, the conductive member 332b may be disposed in the contact member 332a to be interposed between an inner side surface of the contact member 332a and the end of the cylinder rod 333a. The conductive member 332b may be configured of a conductive metal string to be smoothly conducted with the screen M of the AVM system. When the screen M of the AVM system is configured of the capacitive touch screen, the conductive member 332b may be conducted with the screen M of the AVM system to perform the touch operation on the screen M of the AVM system.

As illustrated in FIG. 10, the elastic member 332c may be disposed in the contact member 332a to be interposed between the conductive member 332b and the end of the cylinder rod 333a. The elastic member 332c is preferably configured of a compression spring but is not limited thereto. The elastic member 332c is elastically contracted by the pressing force applied when the contact member 332a contacts the screen M of the AVM system to be able to absorb scattering of the screen M of the AVM system.

The actuator 333 may be installed on the first unit frame 31 not to interfere with the first multi-joint robot 22 or the third multi-joint robot 26. For example, as illustrated in FIG. 8, the actuator 333 may be installed on a lower surface of the other end of the first unit frame 31. The actuator 333 may have various structures to reciprocate the touch probe 332. For example, as illustrated in FIG. 8, the actuator 333 may be configured of an air cylinder including the cylinder rod 333a. The actuator 333 may reciprocate the touch probe 332 so that the contact member 332a or the conductive member 332b may perform the touch operation on the screen M of the AVM system.

The controller 70 may control the actuator 333 to allow the touch probe 332 to perform the touch operation on the screen M of the AVM system and control the vision camera 331 to photograph the screen M of the AVM system and the touch probe 332. By doing so, the controller 70 may automatically calibrate the AVM system based on the locations of the AVM targets 15 included in the inspection booth 10 and inspect whether the AVM system is normally operated, including whether the screen M of the AVM system normally outputs the image of the AVM targets 15.

The HUD inspector 34 is provided to calibrate and inspect the HUD system that is provided in the vehicle V. Here, the head up display (HUD) system means a technology of displaying information required for driving of the vehicle V such as navigation information within a range in which it does not deviate from a main view of a driver on the windshield glass G of the vehicle V while the vehicle V drives.

A structure of the HUD inspector 34 is not particularly limited. For example, the HUD inspector 34 may include the vision camera that photographs the image displayed by the HUD system. By the way, the vision camera 331 for the AVM inspector 33 is already installed in the first inspection unit 30. Therefore, the vision camera 331 for the AVM inspector 33 is preferably used even as the HUD inspector 34 rather than separately installing the vision camera only for the HUD inspector 34.

As illustrated in FIG. 9, the vision camera 331 may photograph the image of the HUD system displayed on the windshield glass G in the state in which it enters the vehicle V by the first multi-joint robot 22 or the third multi-joint robot 26 and transfer the photographed image to the controller 70.

As described above, the first inspection unit 30 is provided in pair by being mounted, one by one, on the first multi-joint robot 22 and the third multi-joint robot 26, respectively. Therefore, as illustrated in FIG. 9, the image of the HUD system may be photographed by the vision camera 331 included in any one of the first inspection units 30 and the screen M of the AVM system may be photographed by the vision camera 331 included in the other of the first inspection units 30. As a result, the HUD system and the AVM system may be inspected simultaneously, and therefore it is possible to reduce the time required to inspect the driver assistance systems. However, the present disclosure is not limited thereto, when any one of the first inspection units 30 fails, in the case in which there are special circumstances, the AVM system and the HUD system may also be inspected sequentially by the vision camera 331 provided in any one of the first inspection units 30.

Meanwhile, the inspection booth 10 is provided with the second entrance 11b through which the inspected vehicle V goes out. By doing so, if light from the already inspected vehicle V or other external light is irradiated to the windshield glass G through the second entrance 11b, the screen of the HUD system is likely to be distorted due to the external light. To solve the problem, as illustrated in FIG. 9, the roll screen 14 may be wound out to block the windshield glass G when the HUD system is being inspected to prevent the external light introduced through the second entrance 11b from being irradiated to the windshield glass G.

The controller 70 may control the vision camera 331 to photograph the screen of the HUD system. By doing so, the controller 70 analyzes and processes the image of the screen of the HUD system transferred from the vision camera 331 to inspect whether the HUD system is normally operated and performs a calibration operation of the HUD system when the HUD system is abnormally operated. By the way, as illustrated in FIG. 9, one surface of the roll screen 14 facing the windshield glass G is provided with the reference pattern 14a. Therefore, the controller 70 may control the vision camera 331 to photograph the reference pattern 14a, thereby performing the calibration on the vision camera 331 based on the image of the reference pattern 14a photographed by the vision camera 331.

The sensing sensor 35 is installed on the first unit frame 31 not to interfere with the first multi-joint robot 22 or the third multi-joint robot 26. For example, as illustrated in FIG. 8, the sensing sensor 35 may be installed on a side portion of the other end of the first unit frame 31. The sensing sensor may be configured of various kinds of sensors that may sense the structure of the vehicle V. For example, the sensing sensor 35 may be configured of an ultrasonic sensor.

The controller 70 may analyze and process the signal transferred from the sensing sensor 35 to sense the structure of the vehicle V. By doing so, the controller 70 may control the motions of the first multi-joint robot 22 or the third multi-joint robot 26 so that the first and second inspection units 30 and 40 do not interfere with the structure of the vehicle V.

Meanwhile, the case in which the first inspection unit 30 includes the AVM inspector 33 and the HUD inspector 34 to inspect the AVM system and the HUD system is described, but the present disclosure is not limited thereto. That is, the first inspection unit 30 may further include an inspector for inspecting other driver assistance systems.

Figure 11:
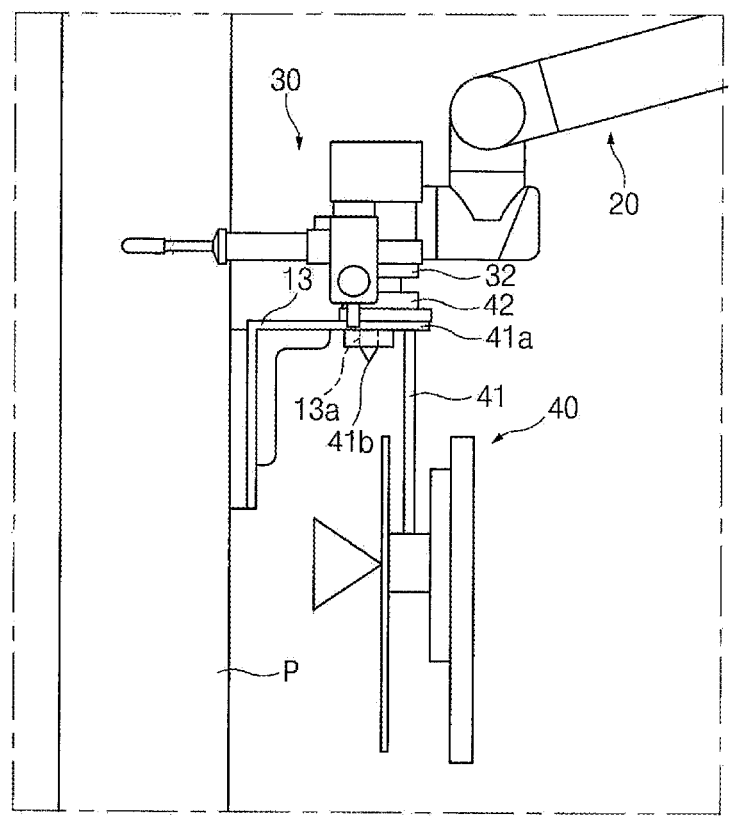
FIGS. 11 to 13 are diagrams for describing a method for separating and coupling a first inspection unit and a second inspection unit illustrated in FIG. 8.
Figure 12:
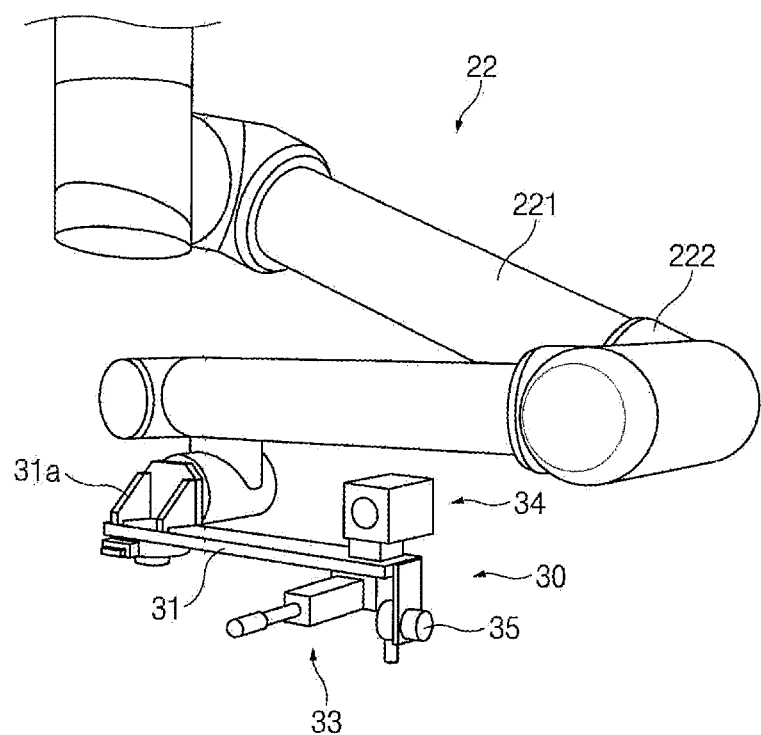
Figure 13:
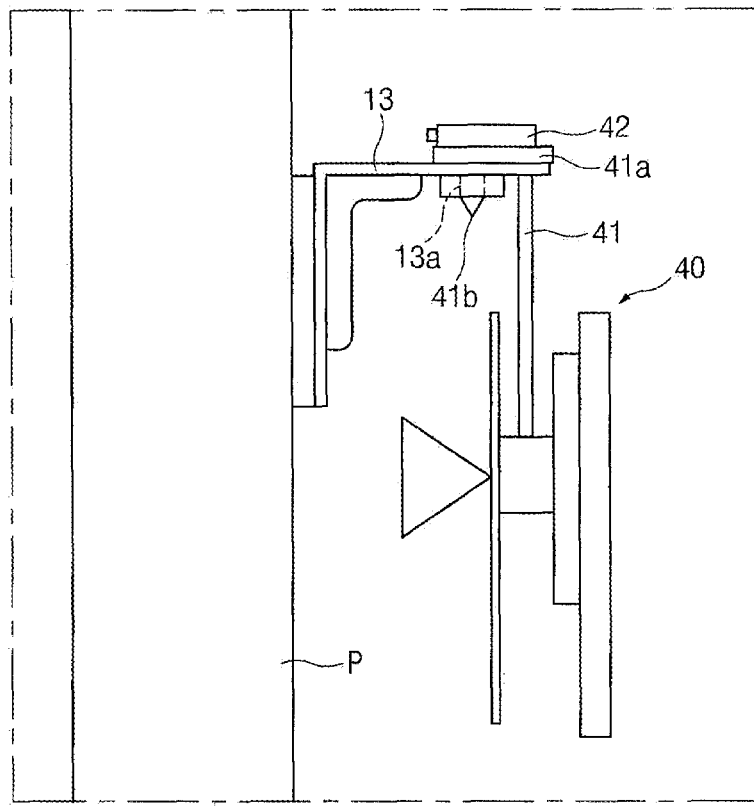

FIGS. 11 to 13 are diagrams for describing a method for separating and coupling a first inspection unit and a second inspection unit illustrated in FIG. 8.

The second inspection unit 40 is an apparatus for inspecting the SCC system and the LDWS from the outside of the vehicle V.

The structure of the second inspection unit 40 is not particularly limited. For example, as illustrated in FIG. 8, the second inspection unit 40 may include a second unit frame 41 forming the support frame of the second inspection unit 40, the second coupler 42 separating and coupling the first inspection unit 30 and the second inspection unit 40, an SCC inspector 43 provided to inspect the SCC system from the outside of the vehicle V, and an LDWC inspector 44 provided to inspect the LDWC system from the outside of the vehicle V. The second inspection unit 40 may be mounted in pair by being mounted, one by one, on the first inspection unit 30 mounted on the first multi-joint robot 22 and the first inspection unit 30 mounted on the third multi-joint robot 26.

As illustrated in FIG. 8, the second unit frame 41 may be separably mounted from the first unit frame 31 by the second coupler 42. The second unit frame 41 preferably has a board shape elongated to be vertical to the first unit frame 31, but is not limited thereto.

As illustrated in FIG. 8, an upper end portion of the second unit frame 41 is provided with the second mounting bracket 41a. The second mounting bracket 41a may have a shape corresponding to the seating frame 13 to be seated on the seating frame 13 of the inspection booth 10. As illustrated in FIG. 8, the second mounting bracket 41a may be provided with at least one alignment protrusion 41b protruding from a lower surface of the second mounting bracket 41a so that the alignment protrusion 41b may be inserted into the aligning groove 13a provided on the seating frame 13. However, the structure of the second mounting bracket 41a is not limited thereto, but the seating frame 13 may be provided with the alignment protrusion 41b and the second mounting bracket 41a may also be provided with the alignment groove 13a.

The second coupler 42 is installed on the second unit frame 41 not to interfere with the first multi-joint robot 22 or the third multi-joint robot 26. For example, as illustrated in FIG. 8, the second coupler 42 may be installed on an upper surface of the second mounting bracket 41a. A kind of couplers that may be used as the second coupler 42 is not particularly limited and therefore the coupler separably coupled with the first coupler 32 generally used in the tool changer field may be used as the second coupler 42. The second coupler 42 may be separably coupled with the first coupler 32 of the first inspection unit 40 to separably couple the first inspection unit 30 with the second inspection unit 40.

Hereinafter, the method for separably coupling the first inspection unit 30 with the second inspection unit 40 by the first and second couplers 32 and 42 will be described with reference to FIGS. 11 to 13.

First, as illustrated in FIG. 11, the controller 70 controls the transfer unit 60 and the multi-joint robot 20 in the state in which the first inspection unit 30 and the second inspection unit 40 are coupled with each other by the first coupler 32 and the second coupler 42 to seat the second mounting bracket 41a of the second inspection unit 40 on the seating frame 13. In this case, the controller 70 controls the transfer unit 60 and the multi-joint robot 20 to allow the alignment protrusion 41b of the second mounting bracket 41a to be inserted into the alignment groove 13a of the seating frame 13, thereby stably seating the second mounting bracket 41a at the preset seating location.

Next, as illustrated in FIG. 11, the controller 70 may control the first and second couplers 32 and 42 to be separated from each other in the state in which the second mounting bracket 41a is seated on the seating frame 13, thereby separating the first inspection unit 30 and the second inspection unit 40 from each other. As a result, as illustrated in FIGS. 12 and 13, the first inspection unit 30 keeps on being mounted on the multi-joint robot 20 and the second inspection unit 40 is seated on the seating frame 13.

Next, the controller 70 may inspect the AVM system and the HUD system by the first inspection unit 30 separated from the second inspection unit 40.

Figure 14:
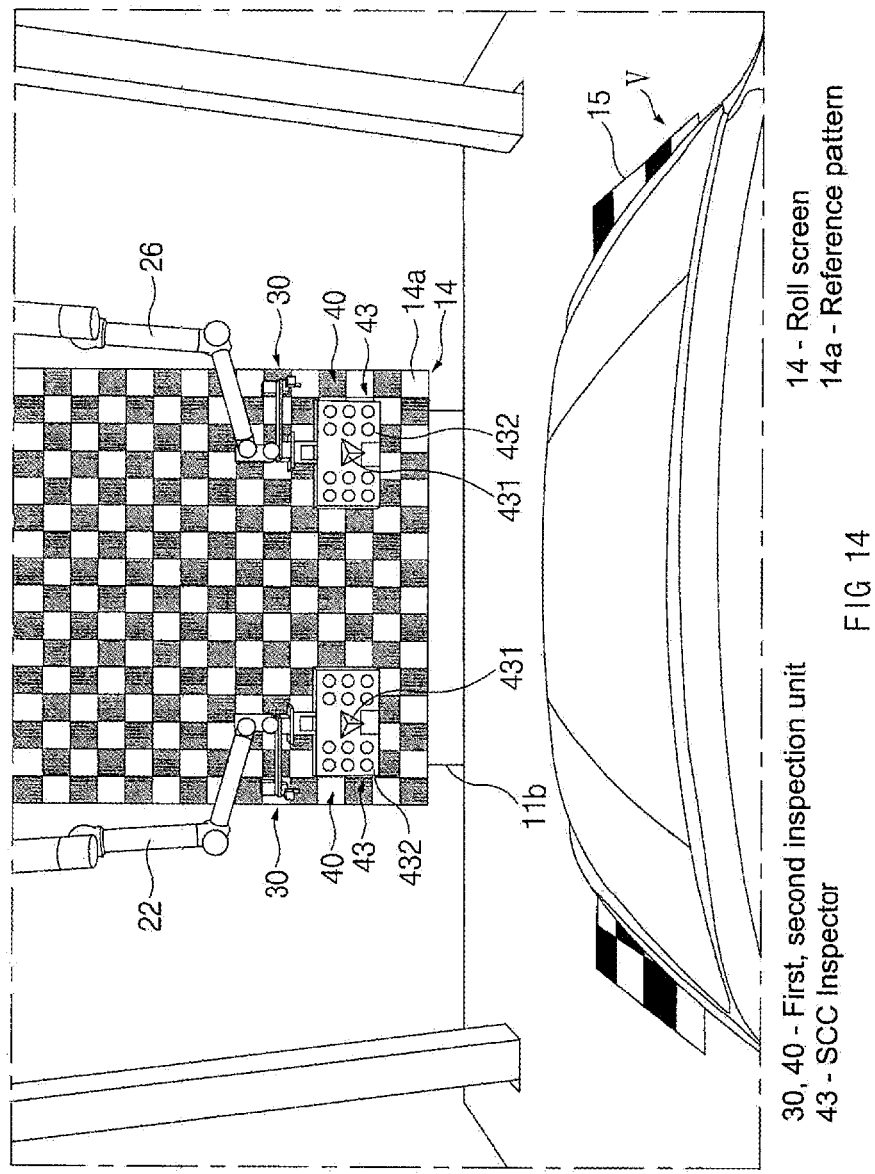
FIG. 14 is a diagram for describing a method for inspecting an SCC system using the second inspection unit illustrated in FIG. 8.
Figure 15:
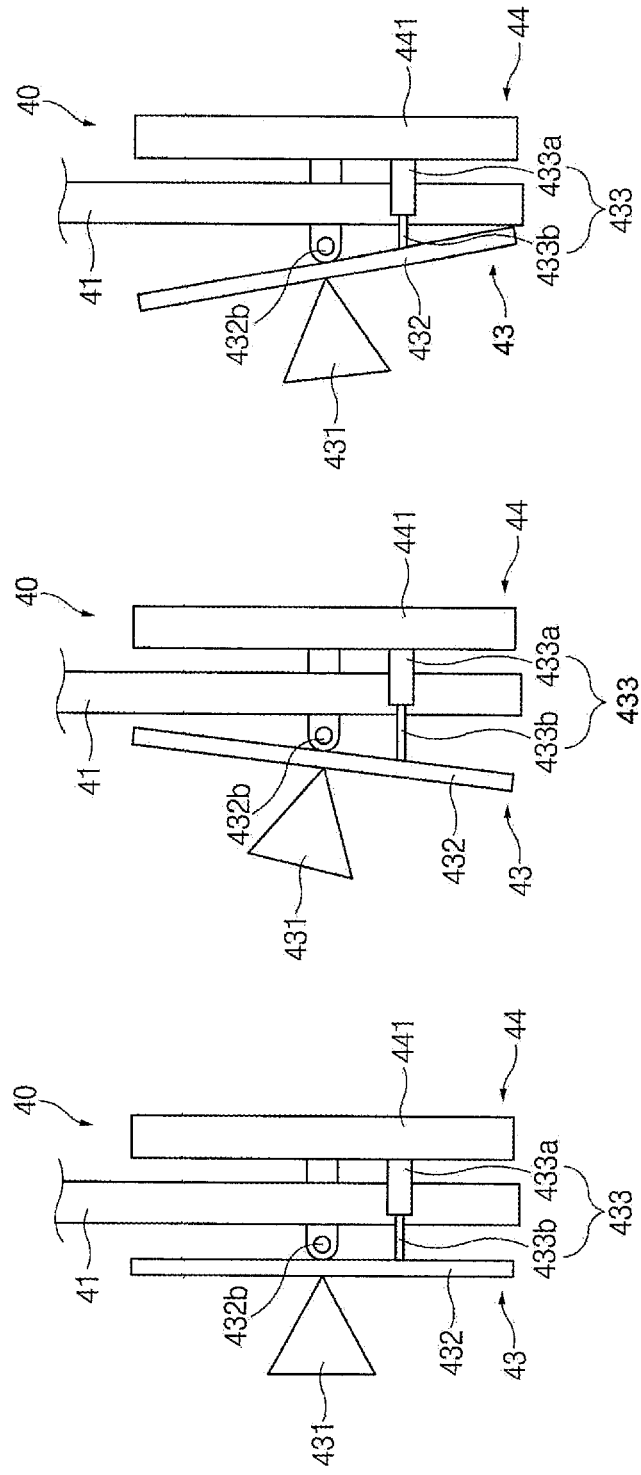
FIGS. 15A-15C are diagrams for describing a tilting member of the second inspection unit illustrated in FIG. 8.
Figure 16:
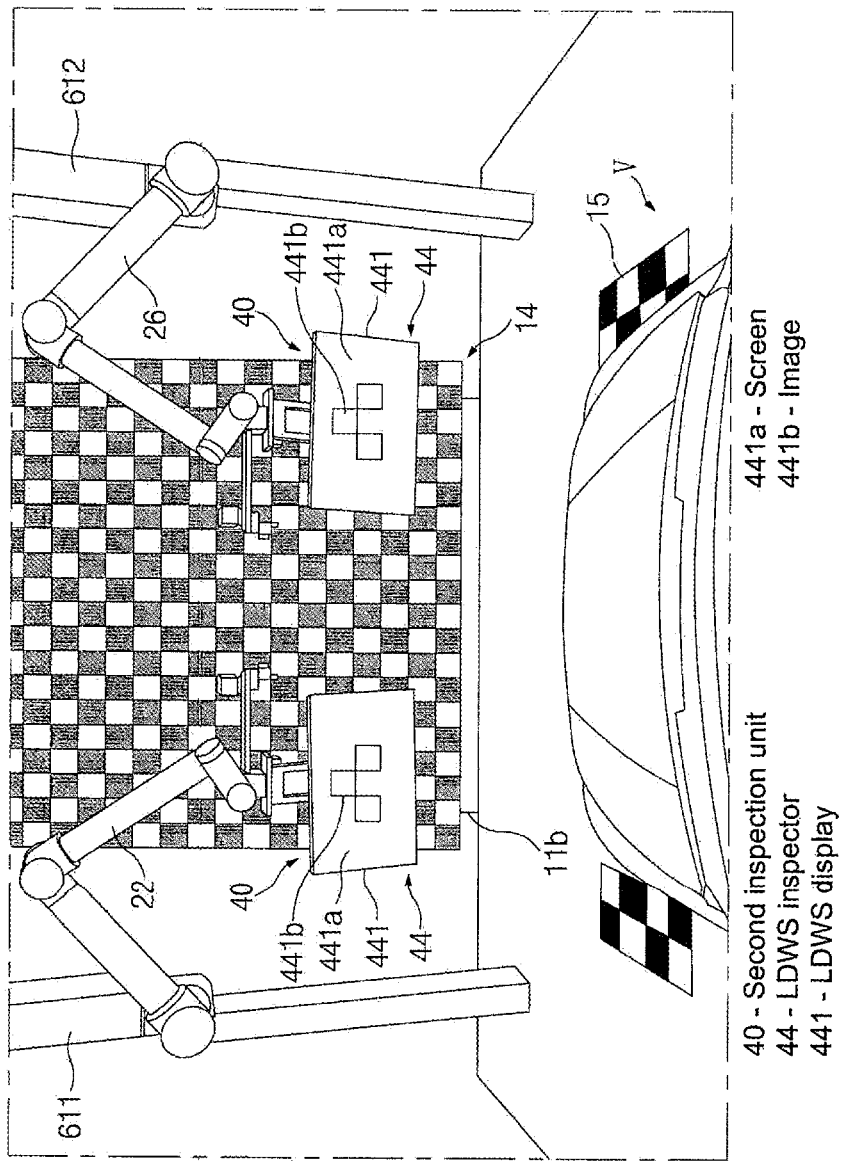
FIG. 16 is a diagram for describing a method for inspecting an LDWS using the second inspection unit illustrated in FIG. 8.

FIG. 14 is a diagram for describing a method for inspecting an SCC system using the second inspection unit illustrated in FIG. 8 and FIGS. 15A-15C are diagrams for describing a tilting member of the second inspection unit illustrated in FIG. 8. FIG. 16 is a diagram for describing a method for inspecting an LDWS using the second inspection unit illustrated in FIG. 8.

The SCC inspector 43 is provided to calibrate and inspect the SCC system that is provided in the vehicle V. Here, as illustrated in FIG. 4, the smart cruise control (SCC) system means a technology of measuring an inter-vehicle distance from a forward vehicle using an SCC radar sensor S mounted at the front portion of the vehicle V and appropriately maintaining the inter-vehicle distance. In the art, the SCC system is referred to as a cruise control system or an automatic speed control apparatus.

A structure of the SCC inspector 43 is not particularly limited. For example, as illustrated in FIG. 8, the SCC inspector 43 may include an SCC radar reflector 431 reflecting an SCC radar signal output from the SCC radar sensor S of the SCC system and inputting the reflected SCC radar signal to a receiver (not illustrated) of the SCC system, an absorbing member 432 absorbing the SCC radar signal that is not reflected by the SCC radar reflector 431, and a tilting member 433 adjusting a disposition angle of the SCC radar reflector 431 depending on a disposition form of the SCC radar sensor S.

As illustrated in FIG. 8, the SCC radar reflector 431 is mounted on the absorbing member 432 to more protrude toward the SCC radar sensor S than the absorbing member 432. The SCC radar reflector 431 serves to reflect the SCC radar signal output from the SCC radar sensor S of the SCC system and input the reflected SCC radar signal to the receiver of the SCC system. In the art, the SCC radar reflector 431 is called a corner reflector.

As illustrated in FIG. 8, the absorbing member 432 is made of a material that may absorb the SCC radar signal and is mounted on the second unit frame 41. The absorbing member 432 preferably has a board shape having a wider area than the SCC radar reflector 431, but is not limited thereto.

The absorbing member 432 is preferably provided with at least one opening 432a to reduce the overall volume of the absorbing member 432, but is not limited thereto. The absorbing member 432 may absorb some of the SCC radar signals, which are not reflected by the SCC radar reflector 431, among the SCC radar signals output from the SCC radar sensor S. Therefore, some of the SCC radar signals that are not reflected by the SCC radar reflector 431 are reflected by other structures to be input to the SCC system, such that the absorbing member 432 may prevent the inspection result of the SCC system from being distorted.

The tilting member 433 is provided to adjust the disposition angle of the SCC radar reflector 431 and the absorbing member 432 depending on the disposition form of the SCC radar sensor S. The disposition form of the SCC radar sensor S may be changed depending on the specifications of the vehicle V, and therefore a propagation direction of the SCC radar signal output from the SCC radar sensor S may also be changed depending on the specifications of the vehicle V. Therefore, the SCC inspector 43 includes the tilting member 433 that may adjust the disposition angle of the SCC radar reflector 431 and the absorbing member 432 so that the SCC radar signal may be incident on the SCC radar reflector 431 in a predetermined direction.

A structure of the tilting member 433 is not particularly limited. For example, as illustrated in FIG. 15A, the tilting member 433 may be configured of a cylinder. As such, when the tilting member 433 is configured of the cylinder, as illustrated in FIG. 15A, a cylinder body 433a may be fixed to a LDWS display 441 and the cylinder rod 433b may be fixed to the absorbing member 432. As illustrated in FIG. 15A, the absorbing member 432 may be hinged with the second unit frame 41 to be rotatable with respect to a rotating shaft 432b. As a result, as illustrated in FIGS. 15B and 15C, the tilting member 433 may adjust the disposition angle of the absorbing member 432 and the SCC radar reflector 431 depending on the disposition form of the SCC radar sensor S.

As illustrated in FIG. 14, the controller 70 controls the transfer unit 60 and the multi-joint robot 20 to allow the SCC radar signal output from the SCC radar sensor S of the SCC system to be reflected by the SCC radar reflector 431 and to be input to the receiver of the SCC system. In this case, the controller 70 preferably controls the transfer unit 60 and the multi-joint robot 20 to allow the distance between the SCC radar reflector 431 and the SCC radar sensor S to be the preset measurement distance. Further, the controller 70 controls the tilting member 433 to adjust the disposition angle of the SCC radar reflector 431 and the absorbing member 432 depending on the disposition form of the SCC radar sensor S. By doing so, the controller 70 may calculate a difference between a transmitting value of the SCC radar signal output from the SCC radar sensor S and a receiving value of the SCC radar signal input to the receiver of the SCC system by the SCC radar reflector 431 to calibrate a measurement point of the SCC system and inspect whether the SCC system is normally operated.

Meanwhile, the SCC radar sensor S may be installed in one or two depending on the specifications of the vehicle V. By the way, as illustrated in FIG. 3, the second inspection unit 40 is provided in pair by being mounted, one by one, on the first multi-joint robot 22 and the third multi-joint robot 26, respectively. Therefore, when one SCC radar sensor S is installed, the SCC system may be calibrated and inspected by restrictively using only the SCC inspector 43 included in any one of the second inspection units 40. On the other hand, when two SCC radar sensors S are installed, the SCC system may be calibrated and inspected by using both of the SCC inspectors 43 included in the pair of second inspection units 40. That is, the operation number of second inspection units 40 may be selectively adjusted depending on the installation number of SCC radar sensors S.

The LDWC inspector 44 is provided to inspect the LDWS that is provided in the vehicle V. Here, the lane departure warning system (LDWS) means a technology of warning a driver of when it is determined that the vehicle V is out of a lane using a warning sound, or the like as illustrated in FIG. 4. As illustrated in FIG. 4, the LDWS photographs a lane on a road located in front of the vehicle V using an LDWS camera L that is mounted on an inner side surface of the windshield glass G under a room mirror of the vehicle V and then analyzes and processes an image of the lane photographed by the LDWS camera L to determine whether the vehicle V is out of the lane.

Figure 18:
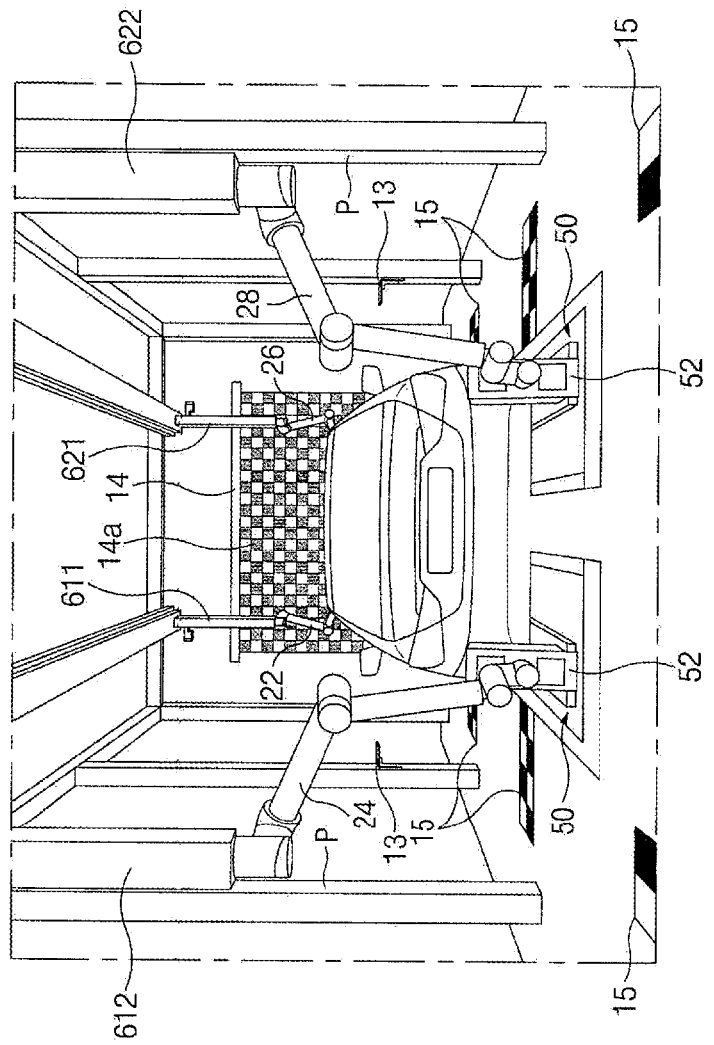
FIG. 18 is a diagram for describing a method for inspecting a BSD system using the third inspection unit illustrated in FIG. 17.

A structure of the LDWS inspector 44 is not particularly limited. For example, as illustrated in FIG. 8, the LDWC inspector 44 may include the LDWS display 441 that may output an image 441b for LDWS inspection. As illustrated in FIG. 18, the LDWS display 441 is fixedly installed on the second unit frame 41 so that the screen 441a that may output the image 441b for LDWS inspection is toward an opposite direction to the protruding direction of the SCC radar reflector 431. A kind of the image 441b for LDWS inspection that may be output by the LDWS display 441 is not particularly limited. For example, as illustrated in FIG. 16, the LDWS display 441 may output an LDWS calibration target for calibrating the measurement point of the LDWS camera L as the image 441b for LDWS inspection.

As illustrated in FIG. 16, the controller 70 controls the transfer unit 60, the multi-joint robot 20, and the LDWS display 441 to allow the LDWS camera L to photograph the image 441b for LDWS inspection. By doing so, the controller 70 may analyze and process the image 441b for LDWS inspection photographed by the LDWS camera L to calibrate the measurement point of the LDWS camera L and inspect whether the LDWS is normally operated.

Meanwhile, as illustrated in FIG. 16, the controller 70 preferably calibrates and inspects the LDWS system using the LDWS displays 441 included in the pair of second inspection units 40 but is not limited thereto. That is, the controller 70 may also calibrate and inspect the LDWS by restrictively using only the LDWS display 441 included in any one of the second inspection units 40.

Meanwhile, the case in which the second inspection unit 40 is separably mounted from the first inspection unit 30 is described, but the present disclosure is not limited thereto. For example, the first coupler 32 may be installed on the arm 221 provided at the distal end of the first multi-joint robot 22 or the third multi-joint robot 26 instead of the first unit frame 31 to separably mount the second inspection unit 40 from the first multi-join robot 22 or the third multi-joint robot 26.

Further, the case in which the sensing sensor 35 for sensing the structure of the vehicle V is installed in the first inspection unit 30 is described, but the present disclosure is not limited thereto. That is, the sensing sensor 35 may also be separately installed in the second inspection unit 40.

Figure 17:
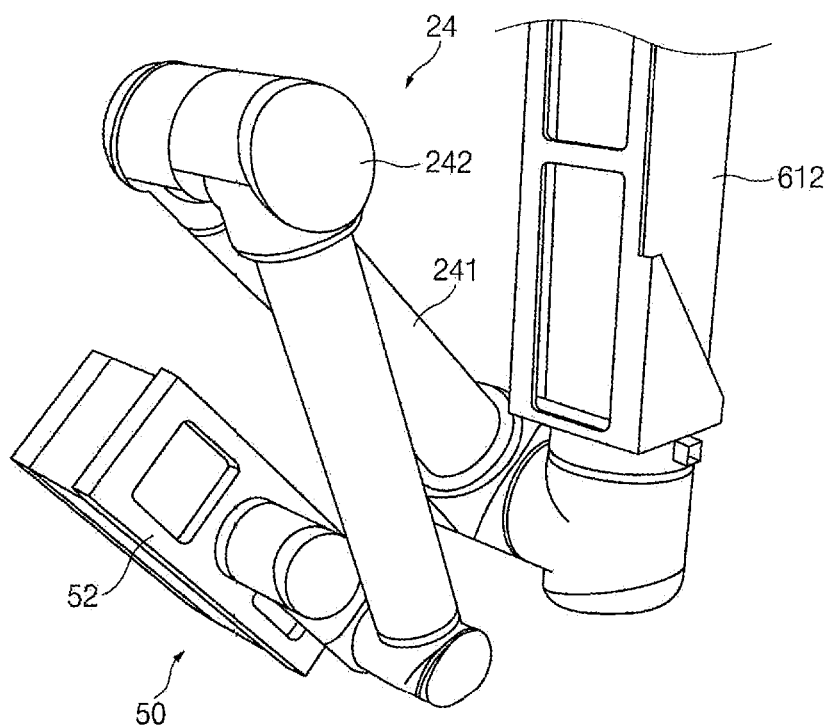
FIG. 17 is a diagram illustrating a state in which a third inspection unit illustrated in FIG. 1 is mounted in the multi-joint robot.

FIG. 17 is a diagram illustrating a state in which a third inspection unit illustrated in FIG. 1 is mounted in the multi-joint robot and FIG. 18 is a diagram for describing a method for inspecting a BSD system using the third inspection unit illustrated in FIG. 17.

The third inspection unit 50 is an apparatus for inspecting a BSD system provided in the vehicle V.

The third inspection unit 50 is provided to inspect the BSD system provided in the vehicle V of the third inspection unit 50. That is, the third inspection unit 50 is configured of a BSD inspector for inspecting the BSD system. Here, the blind spot detection (BSD) system means a technology of sensing a dead zone in the back of the vehicle V by using a pair of BSD radar sensors B that are mounted at the back portion of the vehicle V as illustrated in FIG. 4.

The structure of the third inspection unit 50 is not particularly limited. For example, as illustrated in FIG. 17, the third inspection unit 50 may include a BSD radar reflector 52 that may reflect a BSD radar signal output from the BSD radar sensor B of the BSD system and input the reflected BSD radar signal to the receiver of the BSD system. Further, the third inspection unit 50 is provided in pair by being mounted, one by one, on the second multi-joint robot 24 and the fourth multi-joint robot 28, respectively.

As illustrated in FIG. 17, the BSD radar reflector 52 is mounted on the arm 241 that is provided at the distal end of the second multi-joint robot 24 or the fourth multi-joint robot. The BSD radar reflector 52 serves to reflect the BSD radar signal output from the BSD radar sensor B and input the reflected BSD radar signal to a receiver of the BSD system. In the art, the BSD reflector is called a Doppler generator.

As illustrated in FIG. 18, the controller 70 controls the transfer unit 60 and the multi-joint robot 20 to allow the BSD radar signal output from the BSD radar sensor B of the BSD system to be reflected by the BSD radar reflector 52 and to be input to the receiver of the BSD system. By the way, as described above, the BSD radar sensor B is provided in pair. Therefore, as illustrated in FIG. 18, the controller 70 may use the BSD radar reflectors 52 included in the pair of third inspection units 50 together so that the BSD radar signals output from the BSD radar sensors B may be individually reflected by different BSD radar reflectors 52 and individually input to the receiver of the BSD system. By doing so, the controller 70 may calculate a difference between a transmitting value of the BSD radar signal output from the BSD radar sensor B and a receiving value of the BSD radar signal input to the receiver of the BSD system by the BSD radar reflector 52 to calibrate a measurement point of the BSD system and inspect whether the BSD system is normally operated. Further, the controller 70 preferably performs the calibration and inspection of the BSD system using the third inspection unit 50 simultaneously with the calibration and inspection of another driver assistance system using the first inspection unit 30 or the second inspection unit 40, but is not limited thereto.

Meanwhile, the case in which the third inspection unit 50 for inspecting the BSD system and the second inspection unit 40 for inspecting the SCC system and the LDWS are separately provided is described but the present disclosure is not limited thereto. For example, the BSD radar reflector 52 is installed on the second unit frame 41 of the second inspection unit 40 and thus the third inspection unit 50 may be omitted. As such, when the BSD radar reflector 52 is installed on the second unit frame 41 of the second inspection unit 40, the second multi-joint robot 24 and the fourth multi-joint robot 28 may also be omitted together.

According to the apparatus 1 for inspecting a driver assistance system, a plurality of inspectors that may inspect the driver assistance system provided in the vehicle V are mounted in the state in which they are integrated in the multi-joint robot 20. Therefore, the apparatus 1 for inspecting a driver assistance system may reduce the installation space of the inspectors, reduce the installation costs of the transfer apparatuses for transferring the inspectors, and prevent the inspectors and the transfer apparatuses from being damaged due to the interference with each other, compared to the existing apparatus for inspecting a driver assistance system in which the inspectors are individually installed.

Further, according to the apparatus 1 for inspecting a driver assistance system, since it is possible to sequentially inspect the driver assistance systems depending on the predefined inspection sequence using the multi-joint robot on which the plurality of inspectors are integrally installed, the operator does not violate various regulations defined not to permit the entry of the operator into the inspection booth when the plurality of robots that can be independently operated are being operated together within the single booth. Therefore, according to the exemplary embodiment of the present disclosure, it is possible to quickly manage and operate the inspectors by permitting the operator to enter the inspection booth 10 even during the inspection of the driver assistance system.

Further, according to the apparatus 1 for inspecting a driver assistance system, the second inspection unit 40 for inspecting a driver assistance system from the outside of the vehicle V inspects the driver assistance system inside the vehicle V and is separably mounted from the first inspection unit 30 mounted on the multi-joint robot 20. The apparatus 1 for inspecting a driver assistance system may separate the second inspection unit 40 from the first inspection unit 30 and then inspect the driver assistance system inside the vehicle V using the first inspection unit 30. Therefore, the apparatus 1 for inspecting a driver assistance system may prevent the second inspection unit 40 from being damaged due to the mutual interference with the internal structure of the vehicle V when inspecting the driver assistance system inside the vehicle V and save the time required to inspect the driver assistance system inside the vehicle V.

Figure 19:
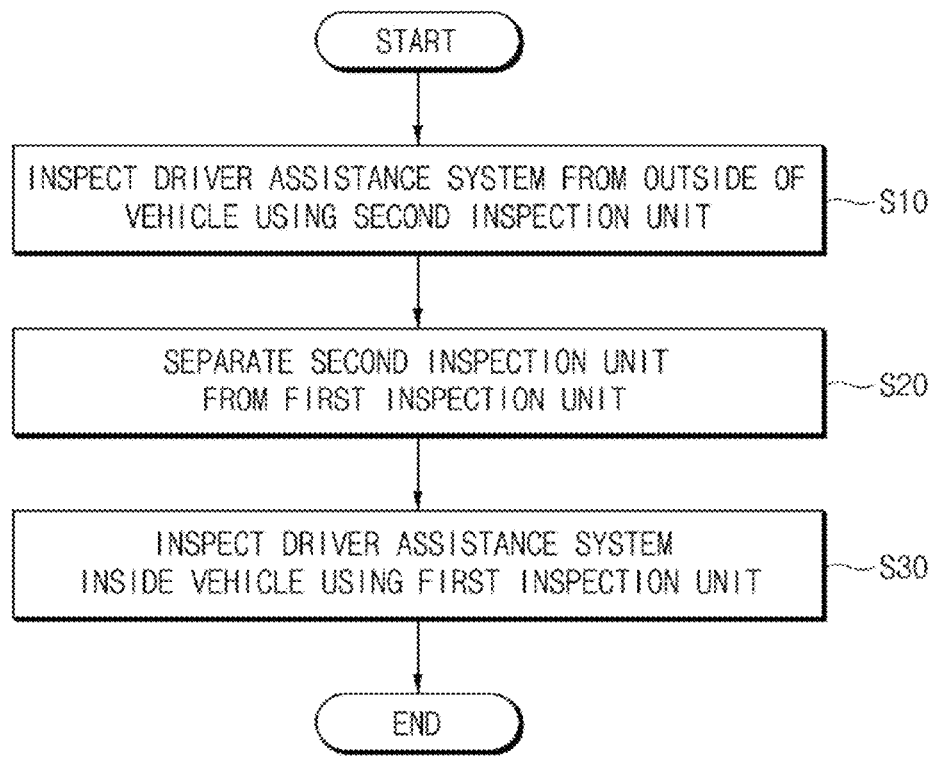
FIG. 19 is a flow chart for describing a method for controlling an apparatus for inspecting a driver assistance system illustrated in FIG. 1.

FIG. 19 is a flow chart for describing a method for controlling an apparatus for inspecting a driver assistance system illustrated in FIG. 1.

Referring to FIG. 19, a method for controlling an apparatus 1 for inspecting a driver assistance system includes inspecting systems, which may be inspected from the outside of the vehicle V, among the driver assistance systems using the second inspection unit 40 (S10); separating the second inspection unit 40 from the first inspection unit 30 (S20); and inspecting systems, which may be inspected inside the vehicle V, among the driver assistance systems using the first inspection unit 30 (S30).

Further, the step S10 is performed by inspecting at least one of the SCC system, the LDWS, and the BSD system.

Further, the step S20 is performed by separating the first coupler 32 included in the first inspection unit 30 and the second coupler 42 included in the second inspection unit 40 from each other.

Further, the step S30 is performed by inspecting at least one of the AVM system and the HUD system.

The method for controlling an apparatus 1 for inspecting a driver assistance system preferentially inspects the driver assistance system, which may be inspected from the outside of the vehicle V, using the second inspection unit 40 and then inspects the driver assistance system, which may be inspected inside the vehicle V, using the first inspection unit 30. However, the present disclosure is not limited thereto, and the method for controlling an apparatus 1 for inspecting a driver assistance system may also be provided to preferentially inspect the driver assistance system, which may be inspected inside the vehicle V, using the first inspection unit 30 and then inspect the driver assistance system, which may be inspected from the outside of the vehicle V, using the second inspection unit 40.

The controller 70 in various embodiments disclosed herein can be implemented using one or more processors coupled to a memory (or other non-transitory machine readable recording medium) storing computer-executable instructions for causing the processor(s) to perform the functions of the controller 70 by providing control signals to various components of the apparatus 1 for inspecting a driver assistance system, analyzing and/or processing signals or data received from various components of the apparatus 1 for inspecting a driver assistance system, and determining whether the inspected driver assistance system is normal based on the analysis of the received signals or data.

The apparatus for inspecting a driver assistance system and the method for controlling the same according to the exemplary embodiment of the present disclosure have the following effects.

First, according to the exemplary embodiment of the present disclosure, the plurality of inspection units that may inspect the driver assistance system installed in the vehicle are mounted in the state in which they are integrated in the multi-joint robot. Therefore, according to the exemplary embodiment of the present disclosure, it is possible to reduce the installation space of the inspection units, reduce the installation costs of the transfer apparatuses for transferring the inspection units, and prevent the inspection units from being damaged due to the mutual interference with the transfer apparatuses.

Second, according to the exemplary embodiment of the present disclosure, it is possible to inspect the driver assistance system inside the vehicle in the state in which the inspection unit for inspecting a driver assistance system from an outside of the vehicle is separated. Therefore, according to the exemplary embodiment of the present disclosure, it is possible to prevent the inspection unit from being damaged due to the mutual interference with the internal structures of the vehicle and reduce the time required to inspect the driver assistance system inside the vehicle.

Third, according to the exemplary embodiment of the present disclosure, it is possible to control the internal environment of the inspection booth to be the same as the manufacturing line and other external facilities. Accordingly, according to the exemplary embodiment of the present disclosure, the inspection data obtained by using the present disclosure without the correction operation due to the environment difference may be used even in the manufacturing line and other external facilities as they are.

Fourth, according to the exemplary embodiment of the present disclosure, since it is possible to sequentially inspect the driver assistance systems depending on the predefined inspection sequence using the multi-joint robot in which the plurality of inspectors are integrally installed, the operator does not violate various regulations defined not to permit the entry of the operator into the inspection booth when the plurality of robots that can be independently operated are being operated together within the single booth. Therefore, according to the exemplary embodiment of the present disclosure, it is possible to quickly manage and operate the inspectors by permitting the operator to enter the inspection booth even during the inspection of the driver assistance system.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for inspecting driver assistance systems provided in a vehicle, comprising:
   a multi-joint robot;
   a first inspection unit mounted on the multi-joint robot to be moved by the multi-joint robot and configured for inspecting some of the driver assistance systems from inside of the vehicle; and
   a second inspection unit separably mounted on the multi-joint robot or the first inspection unit to be moved by the multi-joint robot and configured for inspecting a driver assistance system other than the some of the driver assistance systems from outside of the vehicle, wherein the multi-joint robot is configured to move the first inspection unit into the inside of the vehicle for the first inspection unit to perform an inspection, wherein the second inspection unit is configured to be mounted on the multi-joint robot or the first inspection unit at a time of inspecting the driver assistance system other than the some of the driver assistance systems from the outside of the vehicle and is configured to be separate from the multi-joint robot and the first inspection unit at a time of inspecting the some of the driver assistance systems from the inside of the vehicle, wherein the first inspection unit includes a first unit frame mounted on the multi-joint robot, a first coupler installed on the first unit frame, wherein the second inspection unit includes a second unit frame separably mounted on the first unit frame and a second coupler installed on the second unit frame and separably coupled with the first coupler, and wherein the first unit frame and the second unit frame are separably coupled with each other by the first coupler and the second coupler, wherein the first inspection unit further includes an around view monitoring (AVM) system inspector configured to inspect an AVM system inside the vehicle and a head up display (HUD) system inspector configured to inspect an HUD system inside the vehicle, and wherein the second inspection unit further includes a smart cruise control (SCC) system inspector configured to inspect an SCC system from the outside of the vehicle and a lane departure warning system (LDWS) inspector configured to inspect an LDWS from the outside of the vehicle.

2. The apparatus according to claim 1, wherein the second inspection unit is configured to separate from the multi-joint robot or the first inspection unit at the time of inspecting at least one of the AVM system and the HUD system and is configured to mount on the multi-joint robot or the first inspection unit at the time of inspecting at least one of the SCC system and the LDWS.

3. The apparatus according to claim 1, wherein the AVM inspector includes a vision camera photographing a screen of the AVM system and a touch probe performing a touch operation on the screen of the AVM system to calibrate the AVM system.

4. The apparatus according to claim 3, wherein the touch probe includes a contact member contacting the screen of the AVM system and a conductive member disposed in the contact member.

5. The apparatus according to claim 4, wherein the touch probe further includes an elastic member elastically contracted by a pressing force applied when the contact member contacts the screen of the AVM system to absorb scattering of the screen of the AVM system.

6. The apparatus according to claim 3, further comprising:
an AVM target providing a location reference point of the vehicle for inspecting the AVM system; and
a transfer stage transferring the AVM target depending on specifications of the vehicle.

7. The apparatus according to claim 1, wherein the HUD inspector includes a vision camera photographing an image displayed on a windshield glass of the vehicle by the HUD system.

8. The apparatus according to claim 7, further comprising:
a roll screen blocking the windshield glass from external light.

9. The apparatus according to claim 1, wherein the SCC inspector includes an SCC radar reflector reflecting an SCC radar signal output from an SCC radar sensor of the SCC system and inputting the reflected SCC radar signal to a receiver of the SCC system.

10. The apparatus according to claim 9, wherein the SCC inspector further includes an absorbing member absorbing the SCC radar signal that is not reflected by the SCC radar reflector.

11. The apparatus according to claim 9, wherein the SCC inspector further includes a tilting member adjusting a disposition angle of the SCC radar reflector depending on a disposition form of the SCC radar sensor.

12. The apparatus according to claim 1, wherein the LDWS inspector includes an LDWS display outputting an image for LDWS inspection.

13. The apparatus according to claim 1, further comprising:
a third inspection unit mounted on the multi-joint robot and inspecting a blind spot detection (BSD) system,
wherein the third inspection unit includes a BSD radar reflector reflecting a BSD radar signal output from a BSD radar sensor of the BSD system and inputting the reflected BSD radar signal to a receiver of the BSD system.

14. A method for controlling an apparatus having a multi-joint robot, a first inspection unit mounted on the multi-joint robot, and a second inspection unit separably mounted on the first inspection unit, the method comprising the steps of:
(a) inspecting a driver assistance system from outside of the vehicle using the second inspection unit while the second inspection unit is mounted on the first inspection unit, by inspecting at least one of a smart cruise control (SCC) system, a lane departure warning system (LDWS), and a blind spot detection (BSD) system;
(b) separating the second inspection unit from the first inspection unit by separating the first coupler and the second coupler from each other; and
(c) inspecting another driver assistance system from inside of the vehicle using the first inspection unit, after the multi-joint robot moves the first inspection unit into the inside of the vehicle and the second inspection unit is separated from the first inspection unit by inspecting at least one of an around view monitoring (AVM) system and a head up display (HUD) system,
wherein the first inspection unit includes a first unit frame mounted on the multi-joint robot and a first coupler installed on the first unit frame,
wherein the second inspection unit includes a second unit frame separably mounted on the first unit frame and a second coupler installed on the second unit frame and separably coupled with the first coupler, and
wherein the first unit frame and the second unit frame are separably coupled with each other by the first coupler and the second coupler.

* * * * *